United States Patent [19]
Deacon et al.

[11] Patent Number: 6,049,641
[45] Date of Patent: Apr. 11, 2000

[54] CONNECTION SYSTEM FOR OPTICAL REDUNDANCY

[75] Inventors: David A. G. Deacon; Richard B. Tompane, both of Los Altos; William K. Bischel, Menlo Park; Tony C. Kowalczyk, Palo Alto, all of Calif.

[73] Assignee: Gemfire Corporation, Palo Alto, Calif.

[21] Appl. No.: 09/028,874

[22] Filed: Feb. 24, 1998

[51] Int. Cl.$^7$ .................................................. G02B 6/26
[52] U.S. Cl. .................................. 385/15; 385/17; 385/23
[58] Field of Search ........................................ 385/15–24

[56] References Cited

U.S. PATENT DOCUMENTS

| | | | |
|---|---|---|---|
| 3,871,747 | 3/1975 | Andrews | 350/160 R |
| 4,719,634 | 1/1988 | Streifer et al. | 372/46 |
| 5,083,294 | 1/1992 | Okajima | 365/200 |
| 5,111,060 | 5/1992 | Asada | 307/219 |
| 5,255,332 | 10/1993 | Welch et al. | 385/17 |
| 5,544,268 | 8/1996 | Bischel et al. | 385/4 |
| 5,555,001 | 9/1996 | Lee et al. | 345/93 |
| 5,612,968 | 3/1997 | Zah | 372/50 |
| 5,619,223 | 4/1997 | Lee et al. | 345/93 |

FOREIGN PATENT DOCUMENTS

| | | | |
|---|---|---|---|
| 0 447 639 B1 | 5/1994 | European Pat. Off. | G02B 6/30 |
| 43 06 032 A1 | 9/1994 | Germany | H04B 10/20 |
| 7-20509 | 1/1995 | Japan | G02F 1/313 |
| WO 97/25829 | 7/1997 | WIPO | H04Q 11/00 |

OTHER PUBLICATIONS

"Flat Panel Display Manufacturing Costs", Stanford Resources, Inc. (1996), 3rd Ed., "Repair Systems", pp. 80–81,.

B. L. Booth, "Polymers for Electronic and Photonic Applications" (1990), pp. 435–437.

Appelman, et al., "Self–Aligned Chemically Assisted Ion–Beam–Etched GaAs/(Al,Ga)As Turning Mirrors for Photonic Applications", IEEE Journal of Lightwave Technology (Jan. 1990), vol. 8, No. 1, pp. 39–41.

Becker, et al., "Electrooptical switching in thin film waveguides for a computer communication bus", Applied Optics (Oct. 1979), vol. 18, No. 19, pp. 3296–3300.

Boyd, et al., "Optical channel waveguide arrays coupled to integrated charge–coupled devices and their applications", SPIE Guided Wave Optical Systems & Devices II (1979), vol. 176, pp. 141–147.

Karim, "Electro–Optical Devices and Systems", PWS–Kent Publishing Co. (1990), pp. 436–437.

(List continued on next page.)

*Primary Examiner*—Phan T. H. Palmer
*Attorney, Agent, or Firm*—Fliesler Dubb Meyer & Lovejoy LLP

[57] ABSTRACT

A redundant optical connection system is manufactured in specially prepared form to allow optical connections to be made at a later step. In response to information specifying which of the optical sources are functional, further structure may be activated or introduced into the connection system which guides optical energy to optical outputs from only those of the sources that are functional. In one aspect of the invention, the preliminary form includes primary guiding structures coupling each of a plurality of primary optical sources to a respective application structure, and a secondary guiding structure coupled to a secondary optical source and terminating without yet coupling to any application structure. If the information indicates that one of the primary optical sources is non-functional, then structure can be added or activated which transfers optical energy from the secondary guiding structure into the primary guiding structure corresponding to the non-functional source. In another aspect of the invention, the preliminary form includes a material having N optical sources and more than N output guiding structures. A gap region is provided in the material between the outputs of the optical sources and the inputs of the output guiding structures. Additional guiding structures are later formed or activated in response to the information, to guide optical energy to the inputs of the output guiding structures from only functional ones of the optical sources.

95 Claims, 16 Drawing Sheets

OTHER PUBLICATIONS

Ramey, et al., "Polyurethane Fan–out Channel Waveguide Array for High Resolution Optical Waveguide Imaging", IEEE Transactions on Circuits and Systems (Dec. 1979), vol. Cas–26, No. 12, pp. 1041–1048.

Scarmozzino, et al., "Design and Fabrication of Passive Optical Polymer Waveguide Components for Multimode Parallel Optical Links", SPIE vol. 3005 (1997), pp. 257–265.

Sullivan, et al., "Guided–wave optical interconnects for VLSI systems", SPIE Optical Computing and Nonlinear Materials (1988), vol. 881, pp. 172–176.

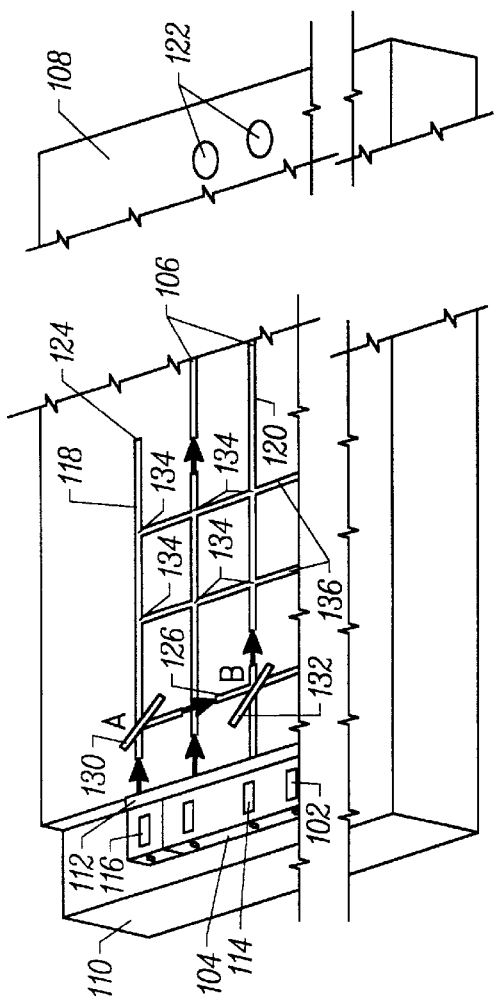
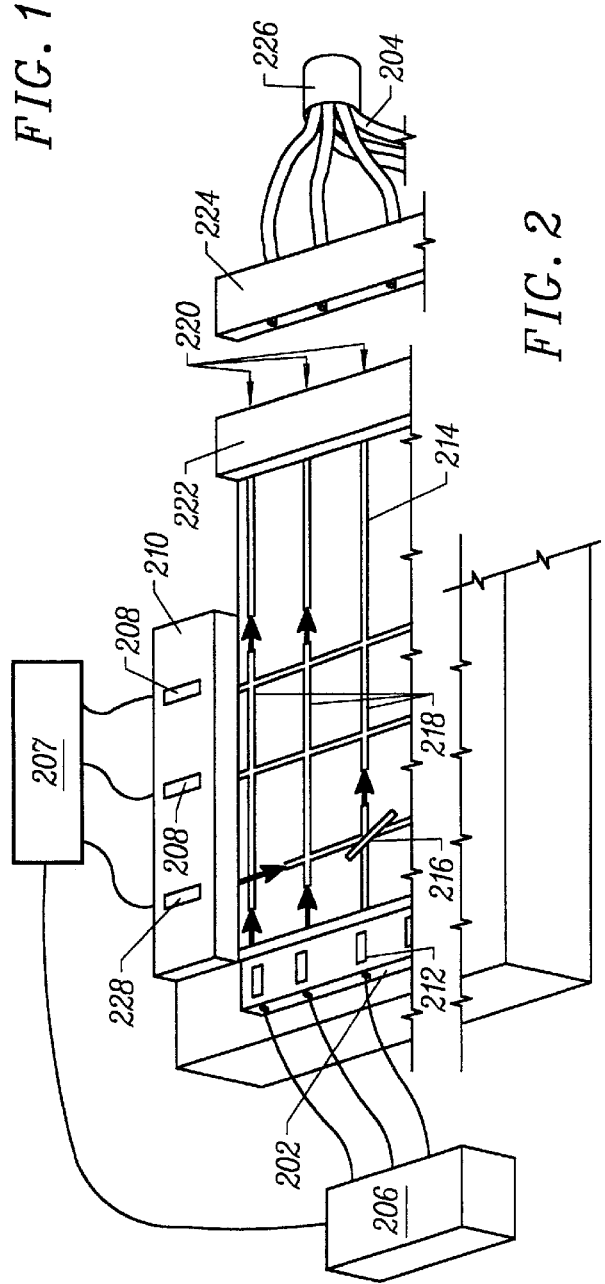
FIG. 1
FIG. 2

(without metal)　　(with metal)

CONNECTION SYSTEM FOR OPTICAL REDUNDANCY

BACKGROUND OF THE INVENTION

The present invention relates to a redundancy system, and the utilization of such a redundancy system to compensate for nonfunctional optical devices.

DESCRIPTION OF RELATED ART

There are several examples of redundancy designs being used in technologies in the prior art, for example, in the fields of electronics and circuit components, light source arrays, and row drivers for flat panel displays, including LCD displays. Some of these are described in the following references, all incorporated by reference herein:

U.S. Pat. No. 5,111,060, May 5, 1992, Asada, "Electronic circuit equipped with redundant or spare circuit elements for every circuit element";

U.S. Pat. No. 5,612,968, March 1997, Zah, "Redundant multi-wavelength light source array";

U.S. Pat. No. 5,619,223, Apr. 18, 1997, Lee et al., "Apparatus for increasing the effective yield of displays with integrated row select driver circuit";

U.S. Pat. No. 4,719,634, Jan. 12, 1988, Streifer et al., "Semiconductor Laser Array with Fault Tolerant Coupling".

"Flat Panel Manufacturing Costs", Third Edition, 1996, Stanford Resources, Inc., Chapter 3, pages 80–81, "Repair Systems".

Although the above references use redundancy designs, the problem surrounding redundancy designs to compensate for damaged optical devices in a manner which minimizes additional fabrication or manufacturing steps does not appear to have been addressed.

In addition, if one applies redundancy techniques known in other fields to systems incorporating optical guiding structures such as waveguides and waveguide combinations, there are additional considerations to contend with, for example the matter of attenuation or loss. The attenuation or loss is that experienced by the light as it travels through the waveguide, and as it scatters off non-smooth waveguide boundaries. This loss is generally attributable to three different mechanisms, scattering, absorption and radiation. Scattering loss results in redirection of guided optical light into radiation modes or other guided modes. Scattering can be caused by the roughness of waveguide boundaries, particulates, etc. Absorption loss is the conversion of the optical energy into the form of heat. Radiation losses are significant e.g. when waveguides are bent through a curve.

As with the manufacturing issues, loss issues also are not addressed adequately in the above-identified references with respect to optical waveguide structures.

SUMMARY OF THE INVENTION

According to the invention, roughly described, a redundant optical connection system is manufactured in preliminary form. In response to information specifying which of the optical sources are functional, further structure is activated or introduced into the connection system which guides optical energy to optical outputs from those of the sources that are functional.

In one aspect of the invention, the preliminary form includes primary guiding structures coupling each of a plurality of primary optical sources to a respective application structure, and a secondary guiding structure coupled to a secondary optical source and terminating without yet coupling to any application structure. If the information indicates that one of the primary optical sources is non-functional, then structure can be added or activated which transfers optical energy from the secondary guiding structure into the primary guiding structure corresponding to the non-functional source.

In another aspect of the invention, the preliminary form includes a material having more than N optical sources and N output guiding structures. A gap region is provided in the material between the outputs of the optical sources and the inputs of the output guiding structures. Additional guiding structures are formed or activated in response to the information, to guide optical energy to the inputs of the output guiding structures from only functional ones of the optical sources.

This invention will be better understood upon reference to the following detailed description in connection with the accompanying drawings.

BRIEF DESCRIPTION OF THE DRAWINGS

These and other features of the present invention will be more fully disclosed in the following detailed description of the drawings in which:

FIGS. 1–5 and 10–13 illustrate redundant optical connection systems according to the invention.

DETAILED DESCRIPTION

Figure 3:
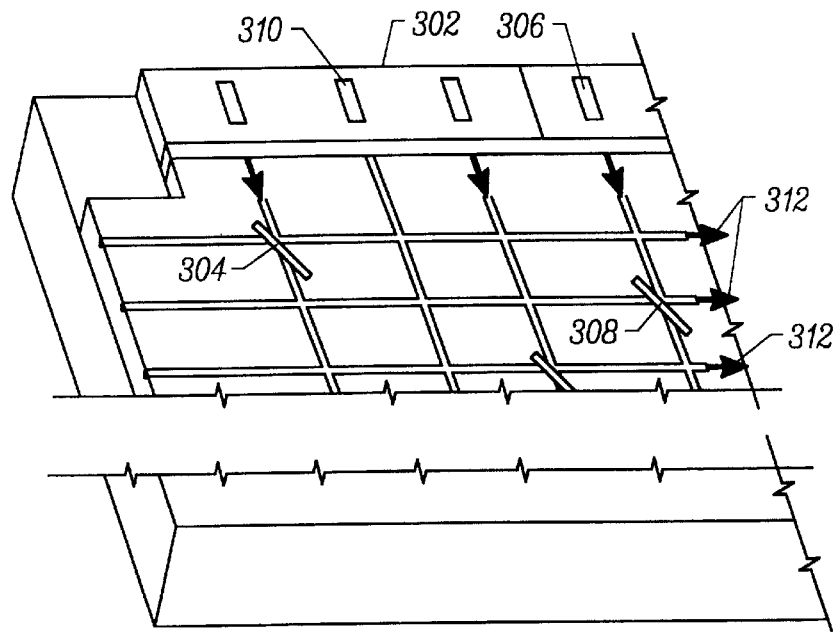

A major application area for the redundancy technology according to the invention is in the field of displays. Other applications include communications, data storage, and data scanning and printing.

FIG. 1 is a diagram showing a portion of a redundant optical source structure including optical light sources, in this case a device diode array or bar 104, coupled to a plurality of guiding structures (structures that confine a transverse dimension of the light along a propagation distance within the structure), in this case a number of output optical channel waveguides 106. The output waveguides 106 are ultimately coupled to individual pixels 122 of a display 108 depending on the states of various controllable optical redirectors (not shown) in a display routing structure. The general characteristics of the display are described in U.S. Pat. No. 3,871,747, March 1975, Andrews, "Optical Waveguide Display Panel", and U.S. Pat. No. 5,544,268, August 1996, Bischel et. al., "Display Panel with Electrically Controlled Waveguide-Routing", both incorporated herein by reference. The optical sources are shown in FIG. 1 attached onto the substrate 110 and butt coupled to the waveguide array. It will be apparent to those skilled in the art that butt coupling is not the only method that may be employed to couple the waveguide array to the light source package. Other coupling methods include, but are not limited to, evanescent coupling (in which two waveguides are placed close to each other so that some light in one couples into the other), lens coupling, and grating coupling (in which a grating is fabricated in or near the input waveguide such that light emerging from the source strikes a portion of the grating such that a portion of the diffracted beam is coupled into the input waveguide). The waveguide array can of course be fabricated in the surface or on top of the surface of the same substrate material by various methods known in the art. In another embodiment, the laser source array is integrated onto the same substrate as the waveguide array, instead of being fabricated separately and subsequently attached.

The types of fabrication mentioned in this application will preferably result in the creation of an integrated optical circuit, rather than a circuit consisting entirely of discrete components. Strictly speaking, integrated optical circuits are optical circuits that have optical functions fabricated or integrated onto/into a planar substrate. The planar substrate used during manufacturing of an integrated optical circuit may be sliced up into individual devices, commonly referred to as "chips", the optical version of an electronic integrated circuit. As commonly used, the term integrated circuits includes both monolithic and hybrid circuits. In monolithic circuits, all the components used for the device, such as a source, waveguide circuits and output optical circuitry are integrated on a single substrate. In the case of hybrid circuits, at least one additional component (which may or may not be a chip) are coupled with at least one integrated optical circuit. Integrated optics typically have a number advantages over conventional optical systems composed of discrete elements. These advantages include a reduced loss (since alignment issues are subject to better control), and smaller size, weight, and power consumption. In addition there is the improved reliability, the reduction of effects caused by vibration, and the possibility of batch fabrication, leading ultimately to reduced cost to the customer. Trading off against these advantages is the requirement that the fabrication process are applied sequentially to the same substrate. As a result, process steps must be compatible with the results of preceding steps, and the yields of each step multiply. In cases where process steps may be incompatible, multiple separate components may be used in a hybrid configuration. Then the compatibility requirement applies separately to each component, but the alignment and reliability issues become more difficult. Clearly the tradeoff between these factors requires a detailed analysis in each separate case.

As more and more compatible structures and processes are developed over time, the trend in the optics industry is towards higher and higher levels of integration to better exploit the advantages listed above. But integrating more components onto a device also increases the number of sites where a failure might occur, jeopardizing the functionality of the system. Failures are particularly expected in active devices such as laser sources, switches, and modulators. Some means must be provided to deal with failures wherever they are likely to occur. The option of increasing device reliability is quite difficult to pursue because of technological limitations. An alternative is to provide additional or redundant devices that can be used in the event of failure. It is the subject of this application to describe the optical connections, the control system, and the preferred arrangements for integrated optical circuits incorporating such redundant optical connection components.

The pixels 122 are examples of what are referred to herein as "application structures". Because the invention applies in many fields aside from displays, for the purposes of this explanation, an application structure is any distinguishable structure which serves some useful purpose, and one whose function is more than merely extinguishing light transmission. Examples of application structures include, but are not limited to, individual lead terminations on optical connectors, data readers, data writers, print heads and display structures, data storage optical distribution structures etc. Application structures have a value if they are energized by optical energy from a correctly functioning optical source. For the purposes of this explanation, application devices whose purpose is to aid in the creation of a redundant connections or the redundancy system, such as a detection system whose purpose is to determine whether primary or secondary optical sources pass functionality criteria (such as power coupled to the guide, crosstalk, lasing threshold, emission wavelength, noise floor, data rate, mode quality, etc.), are excluded from this definition.

The device diode array shown has a plurality of individual device diode emitters, represented here as contacts 102 laterally spaced apart on a common substrate and generating multiple light outputs. A 50 $\mu$m center-to-center spacing is typical, but not essential. As used herein, the term "source" includes composite sources, such as a number of diode emitters of the same or different wavelengths whose outputs are combined in a single composite output. The waveguides 106 likewise have the same lateral spacing as the diode emitters for accepting each of the multiple light outputs from the diode array. To improve the butt coupling efficiency, an index-matching coupling material 112 is provided between the lasers and the waveguides. This material may be a UV-curing adhesive or any other convenient material compatible with the surrounding materials and operating temperature profiles. Coupling between the diode array and the waveguides may be aided by beam shaping, beam collimating and/or focusing optics. The diode emitters are thus aligned with the optical waveguides 106 and light from each individual device emitter is coupled into its respective waveguide.

Once a display has been produced, the product may be tested to ensure it conforms to consumers' expectations. In the event that one of the device emitters is defective, the display in question would incorporate a row on the display which did not illuminate as expected, producing an unacceptable dark line across the display.

In an aspect of the invention, a redundant optical connection system is provided and can be employed to replace a defective optical source, such as a defective laser 114 in the situation discussed above during the testing of such a display or its component parts. The redundancy laser 116, as illustrated in FIG. 1, is a laser located at one end of the laser bar, and one that is not ordinarily required for operation of the display. The redundancy laser 116 when powered will ordinarily provide a light output propagating along waveguide 118 from the upstream direction in the vicinity of the laser 116 and downstream to a point 124 where the waveguide ends at a location remote from the output waveguides 106. In order to redirect this light beam to the row or waveguide that requires it, it may be redirected from point A to point B on FIG. 1. This is accomplished by introducing or activating structure 130 at point A which redirects energy from the source 116 propagating in the waveguide 118, into a cross-connection waveguide 126, and introducing or activating further structure 132 at point B which redirects energy from the cross-connection waveguide 126 into the output waveguide 120 in a downstream direction. Once redirected, the light output from the redundancy laser 116 will then be able to output light into the required waveguide 120 of the display. (As used herein, the terms "upstream" and "downstream" are with reference to the direction of optical energy propagation.)

Note that the waveguide 126 is shown to lie in the same plane as the waveguides 118 and 106 in FIG. 1. This specific geometry is desirable for single-plane integrated optics, but is neither required nor desirable for multiple-plane optical structures where out-of-plane redirection may be used to accomplish the desired optical connections.

It should be noted that for the purposes of this invention, redirection is taken to signify redirection of any portion of the energy available. A higher redirection ratio is desirable, however, and hence certain redirection structures are more desirable than others. In general a redirection ratio of substantially 100% of the available energy is preferred, although a redirection ratio of at least 50% is tolerable in certain applications.

In FIG. 1, the waveguide structures are shown such that the cross-connection waveguide 126 crosses and extends all the way across the primary waveguides. It will be apparent to those skilled in the art that the cross-connection guiding structure could however just extend to the proximity of the destination primary waveguide 120 and still perform its function adequately, that is extending so that it reaches near enough to the guiding structure to enable optical energy to be transferred from the cross-connection guiding structure to the primary guiding structure. The transference of optical energy may be direct or with the aid of additional light redirecting structures. The cross connecting waveguide 126 is not coupled to any of the waveguides 106 until structure 132 is fabricated, ignoring the relatively small crosstalk terms introduced by the index of refraction structures at the intersection of waveguides.

It is important that the cross connecting waveguide 126 couple substantially no optical energy from the waveguides 106 at the intersections. Any such coupling will lead to insertion loss, and the total power remaining in the waveguides 106 after transiting the region of crossing waveguides will be undesirably reduced. The level of coupling that may be acceptable will depend upon the particular application for which the overall device is intended. For example, for a display application where high power is required, a total insertion loss from crossing waveguides of perhaps 50% may be tolerable, so that the tolerable coupling is 50% divided by the total number of crossing waveguides. In the field of communications, the acceptable level of coupling might be higher if amplifiers can be used to boost the power back up to the desired level. The waveguide 126 may be coupled to other application structures such as power monitors or local data monitors or receivers, but it is not coupled to the waveguide 120 until necessary, to avoid reducing the power flowing in those waveguides from the light sources 104.

It may also be important not to couple any power out of the crossing waveguide 126 and into the waveguides 106. Any power propagating in the waveguide 126, either from a coupled source, or coupled in by cross coupling at previous intersections, could couple into the waveguides 106 and interfere with their function. Again, the level below which we can say that substantially no coupling occurs depends on the application. In a display device, such coupled-in power might be negligible below the 10% level, for example, while in a communications device, the coupling might need to remain below 1% or 0.1% to avoid crosstalk between channels, keeping the bit error rate low enough to maintain system integrity.

Figure 11:
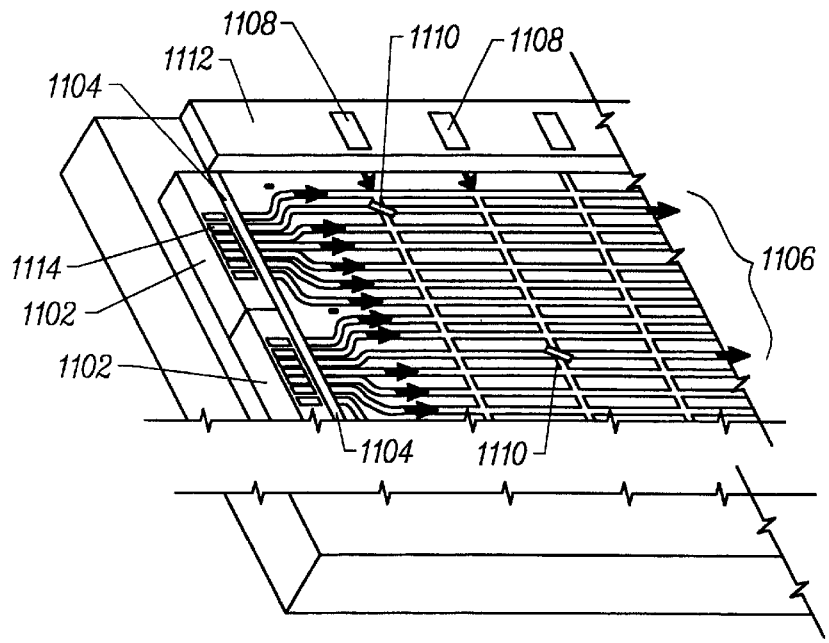
Figure 13:
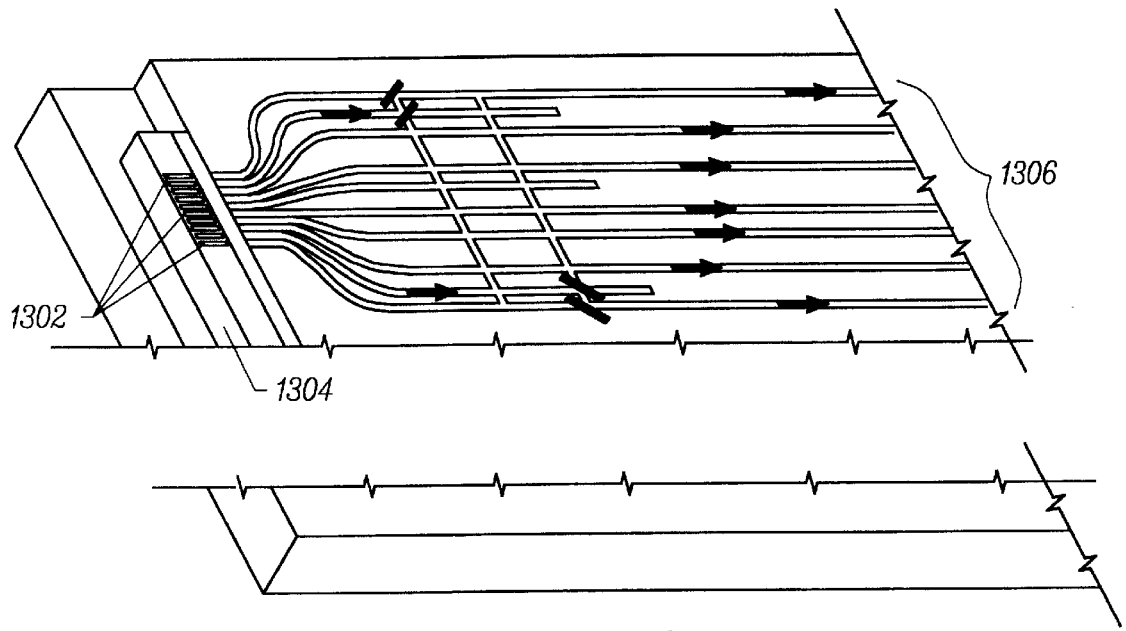

The diode array illustrated in FIG. 1 shows only one redundancy laser. It may however be desirable that a laser diode array have several such redundancy lasers. These redundancy lasers may be dispersed throughout the laser array in any desired fashion, physically located at positions between the principal lasers (interleaved), as illustrated in FIGS. 11 and 13, or located in one or more groups, in the same or different laser arrays.

Redirection of the light output can be accomplished by redundancy connecting elements, for example reflectors or mirrors, installed at fixed positions A and B. Each such mirror may be formed by removing the substrate material from the bulk of the material, leaving a flat surface adjacent to the waveguide and oriented at such an angle so as to direct the reflected light beam down the selected guiding structure, in this case a waveguide. The mirrors may be produced using conventional processing techniques including laser ablation with, for example, a high-power excimer laser or ion beam etching, both of which might define a mirror geometry with the aid of a mask or a pattern of focused beam motion. Using such techniques a mirror, or a total internal reflection interface, can be provided, or alternatively a metal coating can be applied thus providing for a reflector. Laser ablation of mirror surfaces is described in "Polymers for Electronic and Photonic Applications", chapter entitled "Polymers for Integrated Optical Waveguides", by B. L. Booth, 1993, incorporated herein by reference. It should be noted that mirrors or other optical redirectors can, if desired, be made to block any optical energy that might be emitted from the replaced source, from reaching the application structure.

If such a redundancy system is to be incorporated into a display, or any other device, it is desirable that the effects of the fabrication process employed are understood. In addition, the nature of the redundancy connecting element used may itself create minimal losses. For example, if a mirror is formed by removing substrate material from the bulk material, the surface produced may not be perfectly flat, and the surface roughness may attenuate the light as it reflects from the mirror. Depending upon the metallic casing and/or polymer materials used to produce the mirror both absorption and scattering losses may be introduced into the system by introduction of the redundancy system. In addition to the surface roughness, the angle of the mirror produced may be slightly different to the ideal or preferred angle, and once again attenuation of the signal may occur. Care should be taken in the manufacturing process to minimize the optical energy losses caused by each of these factors.

The additional light redirecting structures are shown in the figures at selected intersections between the primary waveguides and the redundancy cross-connection waveguides. It will be apparent that it is not necessary for the redundancy cross-connection waveguides to cross all the primary waveguides, they may only cross a few, and/or end with a "T" intersection. In some embodiments, the redundancy cross-connection waveguides extend only to a proximity of a primary waveguide, although close enough to allow either evanescent coupling or light redirection with or without the addition or activation of a light redirection structure. The waveguides are in this instance spatially near one another without actually touching, but including a separation distance which remains useful for coupling light from one waveguide into the other. The limitation on the separation distance between the connection waveguides and primary waveguides depends on the mode structure of the guides (single- or multi-mode), and also on the application. Situations that require highly efficient optical energy transfer cannot tolerate separation distances as large as other situations that need only some optical coupling without the need for high efficiency. For the case of applications requiring efficiency, a separation distance on the order of a few Rayleigh ranges may be tolerated, or only a fraction of a Rayleigh range may be acceptable. The definition of a Rayleigh range is well known in the art: roughly it is the distance over which an unconfined optical beam begins to expand significantly due to the effects of diffraction. Other applications may tolerate much larger separation distances as long as some detectable light is coupled into the desired output guiding structure. Even though such a cross-coupling waveguide does not actually meet a destination primary waveguide, such an arrangement is still considered to constitute an "intersection" as that term is used herein. In addition, the term "proximity" as used herein includes exactness as a special case. In this last example, it will be evident that the redundancy waveguide may in fact only extend as far as the first primary waveguide, but not actually meet it, extending close enough to allow evanescent coupling to occur.

In addition to these concerns, a redundant optical connection system may incorporate a control system, a system facilitating detection of the defective lasers, and relaying that information to the system responsible for implementing the operation of the redundant connection elements if desired. This system may also relay this information to the redundancy laser driver subsystems so that the redundancy lasers (e.g. 116) may be activated by the information originally intended for the failing laser (e.g. 114). A control system of this nature could be implemented by the use of computer software and firmware.

The implementation of the redundant connection elements is such as to optically connect redundant elements (lasers in this case) into the optical system, bypassing the defective elements, in such a way that the functions of the optical system are preserved. The control system is provided information on the replacement so that the information (and any synchronization) that may have been passed to the defective element is instead passed to the redundant element replacing it.

For the purposes of this explanation, a laser which operates at a level below the desired operation level, is defined as a non-functional or failing laser. The desired operation level may be defined by several parameters such as intensity or power output, thus defining the functionality criteria. A computer controlled system could provide for the possibility of one or more such non-functional lasers without detrimentally affecting the functioning of the system. For example, the control system could deactivate the non-functional laser such that its effects on the remainder of the system were minimized. Alternatively, the system architecture and control system could be designed such that the non-functional laser remains connected into the system, but any light it produces is absorbed or disposed of by additional structures to prevent stray light distribution within the device.

A disadvantage of the system described above is that the laser bars now contain redundancy lasers that will not necessarily be utilized, yet which take up space. If such systems are to be used in devices, the waveguide layout should be designed to accommodate the application. For example, if the device is a display matrix, the rows of waveguides typically would be spaced at a predetermined spacing, usually equally spaced, to give an acceptable picture to the viewer. It is therefore desirable that a means be found so that the presence of the redundant lasers and waveguides do not affect the output waveguide spacing.

Such a means may also be capable of addressing issues that enable the redundancy system employed to function adequately without unduly disturbing the overall architecture or operation of the primary system. Such a means could take into consideration concerns such as attenuation or loss of the optical signal through any redundancy system, e.g. adjusting the redundant laser drive such that the final signal output meets the desired level. As described earlier, loss is the attenuation experienced by light as it travels through the waveguide and associated structures. Minimizing the changes introduced by any redundancy system, such as minimizing the requirement for additional waveguide sections, or minimizing the requirement for bent or curved waveguide sections, ultimately reduces the loss introduced by such a redundancy system.

Notice that the crossing waveguides provided in FIG. 1 pass through special intersections 134 that are carefully prepared to accomplish several simultaneous objectives. For example, the special intersections are designed to contribute minimum loss in the waveguides 106 and 136 and minimum coupling between them, while they are also suitably prepared to allow the fabrication, insertion or activation of the redundancy connecting elements illustrated for example by elements 130 and 132, should the need arise. These special intersections 134 exist in the device whether they are utilized or not, and are fabricated to allow for the possibility that a redundancy source 116 will need to be employed. This type of structure 134 is a "redundancy facilitation structure", a structure that provides for an optical connection to be established between optical paths, while maintaining the integrity of those optical paths prior to the establishment of the connection. By "provides for" we mean that the elements making up the redundancy facilitation structure have been fabricated with measurements within the range required for the operation of the specific type of optical connection structure that has been selected to be optionally implemented at the location of that redundancy facilitation structure. The region in which the redundancy facilitation structure or structures are located may be referred to as the redundancy array region. Once it is determined that an optical connection is desired at one of the redundancy facilitation structures, the processes appropriate for the fabrication or activation of the selected optical connection structure type are applied to the desired locations.

Figure 4:
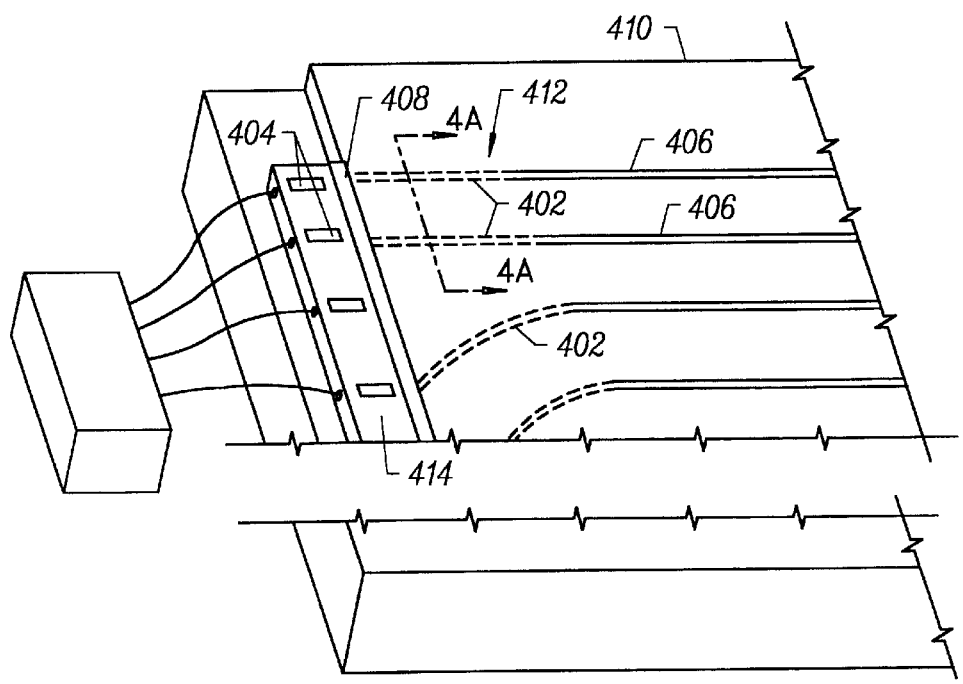
Figure 6:
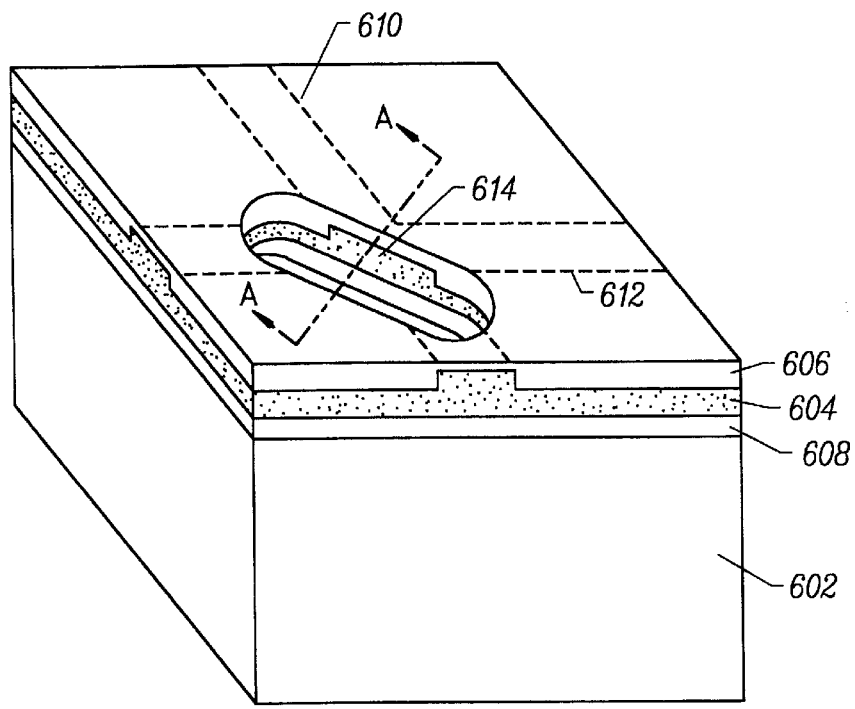
FIG. 6 is a detail of an embodiment of one of the reflectors in FIG. 1.
Figure 7:
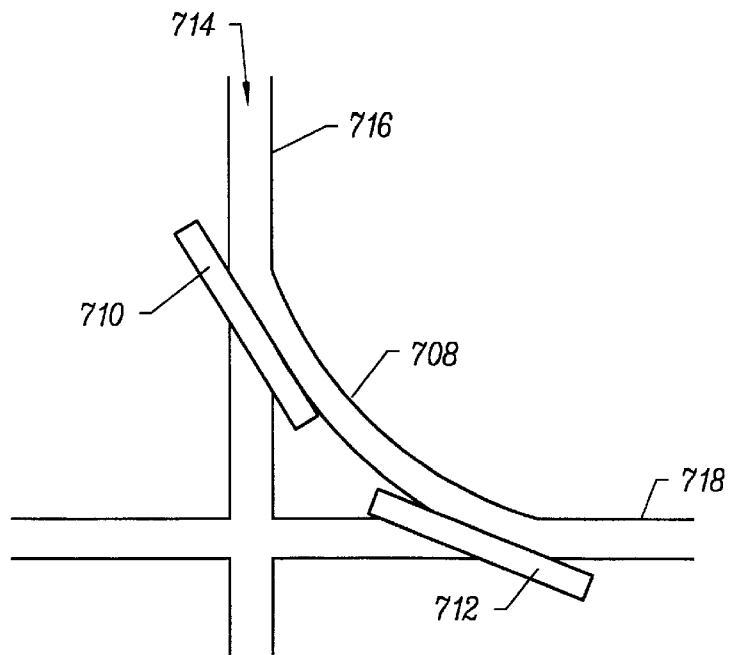
FIGS. 7–9 are alternative embodiments of the redirectors 508 in FIG. 5.
Figure 8:
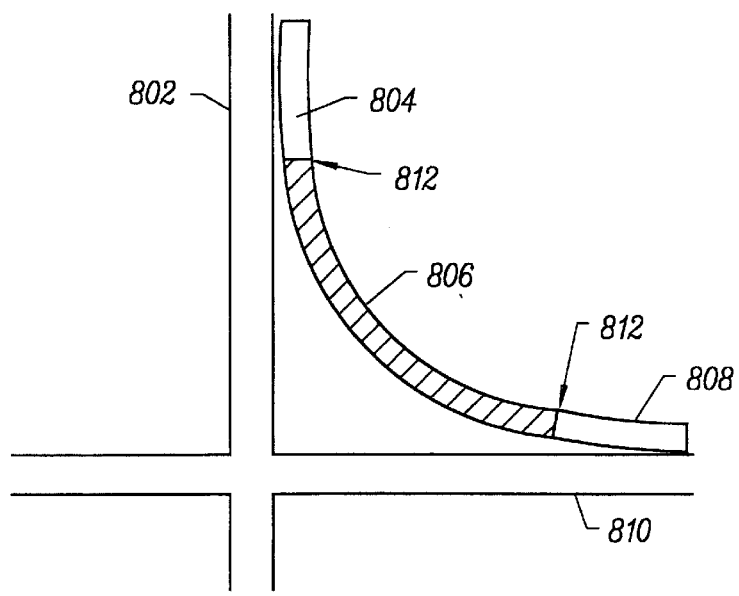
Figure 9:
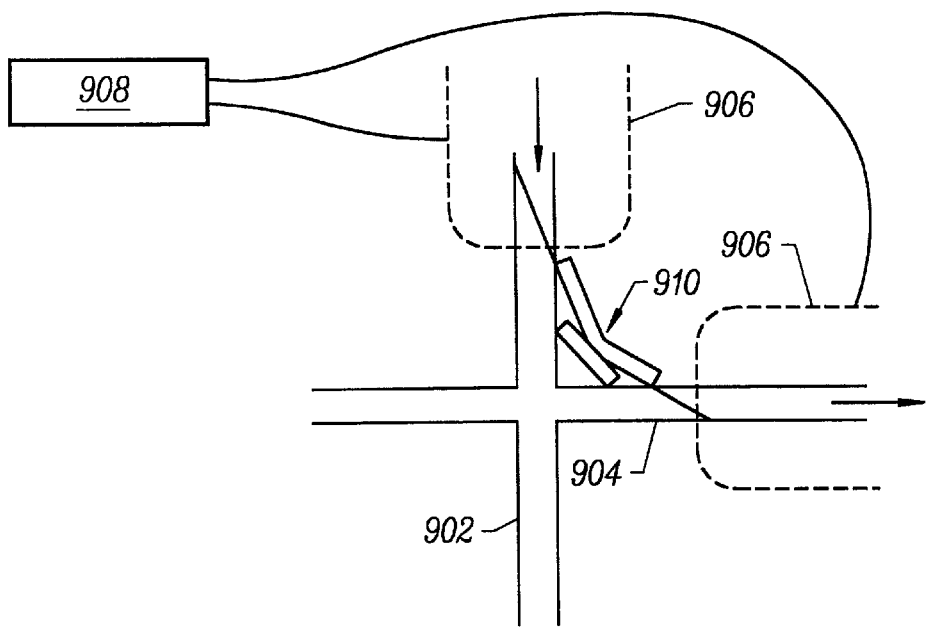

A redundancy facilitation structure may be activated to connect optical paths by many means including activating or controlling a structure such as an electro-optic, magneto-optic or thermo-optic, switch etc., as shown in FIG. 9, removing a predetermined volume of material as shown in FIG. 6, and exposing or fabricating other structure such as shown in FIGS. 4, 7 and 8. As will be seen later in relation to FIG. 4A, referring in particular to element 402, the other structure required to activate the redundancy facilitation structure may be activated upon exposure to a source of light such as ultra-violet radiation. In this case, the structure may be totally invisible prior to activation, but the properties of the materials, the dimensions of the layer thickness, the order of the process steps, etc. have been chosen to allow the connection between the optical source and the optical output to be photodefined. A redundancy facilitation structure is thereby provided in the device to allow for connection of the guiding structures, but without requiring the connection to be made.

There are many variations of a redundancy facilitation structure that may be useful. For example, the waveguides may be fabricated in the same plane or in two different planes. The waveguides may cross at different angles, and multiple waveguide segments may be provided with multiple redirecting structures (such as may be desired in particular in the case of out-of-plane crossing waveguides to control the amount of polarization rotation that occurs during the connection). Alternatively, the waveguides may not cross at all in the sense that in a projection of the structure, normal to the plane of the device, no waveguides intersect. FIG. 4 is an example of a redundancy facilitation structure without crossing waveguides, wherein the connections are photodefined. Note that intersection as used includes the near region surrounding and including the points of nearest approach of two waveguides.

FIG. 1 illustrates an arrangement utilizing an edge-emitting laser diode bar 104 which is in the same plane as the waveguiding structure, and which utilizes conventional coupling techniques to couple light output from the laser diodes into the optical waveguides 106. However, it will be apparent to those skilled in the art that the type of optical source utilized by this invention is not limited to the edge-emitting configuration. For example surface-emitting lasers which emit light from a face of the device that is parallel to the junction plane may be employed. Surface-emitting laser diodes offer the advantage of high packing densities on a wafer and are also generally more efficient than edge-emitting diodes.

Figure 18:
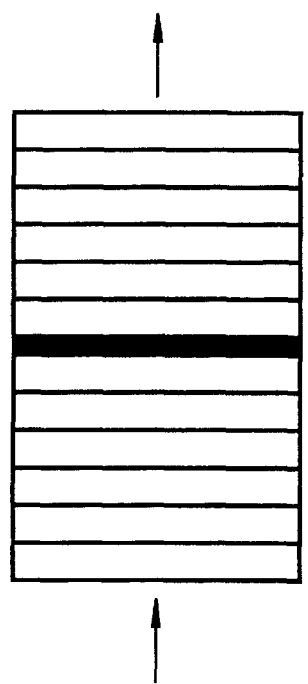
FIG. 18 is a schematic of a vertical cavity surface emitting laser diode.

FIG. 18 shows a schematic of a vertical cavity surface emitting laser diode, VCSEL, the active layer is bounded on each side in the vertical direction with alternative high and low index layers each of which is designed to be a quarter wavelength thick at the laser wavelength. Each of these stacks of $\lambda/4$ layers acts as a narrow band, highly reflective mirror, and hence forms a vertical cavity. This type of laser may have a diameter in the region of fractions to tens of micrometers. Consequently, an array of about one million vertical cavity cylindrical quantum-well SELDs, each with a diameter of about 2 $\mu$m, can be fabricated on a single 1 cm$^2$ chip. Vertical-cavity surface emitting laser diodes may produce circular output beams and have the advantage of providing easy and efficient coupling of emitted light to optical fibers, or other such guiding structures, which may be brought into close proximity with the active region.

Figure 19:
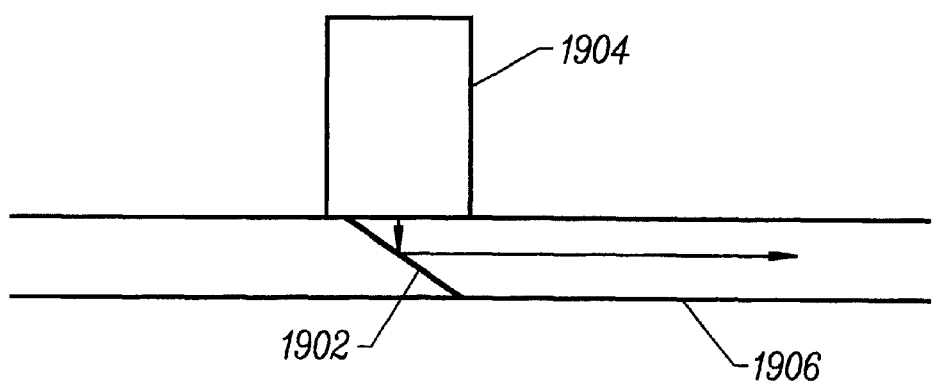
FIG. 19 is a arrangement incorporating a vertical cavity surface emitting laser diode.

If such surface emitting devices are to be utilized, it will be evident to those skilled in the art that the light emitted from the surface will effectively be produced in a plane that is not the same as the device incorporating the guiding structures. Various out-of-plane coupling techniques can be used to enable the light emitted to be coupled into the guiding structures. For example, a laser ablated mirror or reflector can be utilized as illustrated by FIG. 19, the mirror 1902 positioned at such an angle as to direct the light beam from the VCSEL 1904 along the appropriate guiding structure 1906. Other such out-of-plane coupling techniques will be apparent to those skilled in the art, including but not limited to, the use of prisms, gratings or waveguide couplers.

It will be apparent that these out-of-plane coupling techniques can also be utilized with edge-emitting diodes which have be rotated such that the light emitted from them is in a different plane to that of the output guiding structures.

FIG. 2 illustrates an embodiment of a redundant optical source structure in which a laser diode bar 202 is coupled to the optical output waveguides 218, each of which terminates at a respective application structure consisting of an individual waveguide connection 220 on an optical connector 222. A further optical connector 224 is designed to mate with connector 222 such that optical energy from the connections 220 is coupled into respective fibers 204 of a multi-fiber optical cable 226.

The laser diode bar 202 is electrically connectable to a control system 206, including a data source that modulates or otherwise impresses electrical data signals upon the lasers. This control system may also include means 207 to receive and store the functional status of each laser diode to enable extraction of the desired data to operate the redundancy lasers if required, at the exact time required.

In this configuration, the redundancy devices, shown as contacts 208 are located on a separate laser bar 210 from primary laser bar 202, and the devices from the primary laser bar 202 are aligned at the inputs of respective ones of the output waveguides 218. Once the presence of a non-functional laser (such as laser 212) has been established, the light output from one of the device diodes from the redundant device bar 210 is re-routed such that the defective device is effectively replaced by a redundant device in this case 228. All output waveguides, including those aligned at their inputs with a defective optical source, can thereby be made to receive light from a working source. Re-routing of the light output can be accomplished by redundancy connecting elements, for example an integrated reflector or mirror 216, located to ensure that light from the redundancy device is guided into the desired waveguide, (in this case 214). Each such mirror may be formed as described above.

The particular configuration of FIG. 2 enables two or more primary device bars such as 202 to be placed adjacent to one another such that a large system of multiple arrays of waveguides 218 can be formed. The redundancy source in this configuration may service multiple primary arrays such as 202.

In this embodiment the redundancy devices, when required, are redirected with the use of only one redundancy connecting element 216 per defective device, thus enabling a defective device to be replaced by fabricating a mirror to redirect light from a working laser to its desired location. This arrangement minimizes the loss introduced into the system since fewer additional components or connections are utilized compared to the embodiment shown in FIG. 1.

As can be seen, after the redundant optical connection device has been fully manufactured, and all the redirectors required have been placed in position, a device such as the one in FIG. 2 has either 0 or 1 redirector in the path from a working optical source to a corresponding application structure. The device has 0 redirectors in the path if the primary source for that application structure is good, and it has 1 redirector in the path if a redundant source had to be used for that application structure. It will be apparent that additional redirectors may be part of the routing structure beyond that shown in FIG. 2, or between the sources and the redundancy cross-connect array, and then they may often be the same in number for all of the paths. Therefore, often, the above observation can be generalized in that all of the paths in the device from a working source to a corresponding application will have either K or K+1 redirectors in the path, depending on whether a redundant source had to be used. Similarly, a device such as that in FIG. 1 typically would have either K or K+2 redirectors in the path from a working optical source to a corresponding application structure.

A redundant optical connection is an optical connection that is provided for but may not necessarily be used. If an optical device is non-operational or does not pass the functionality criteria for that device, redundant optical connections can be implemented to provide an optical connection bypassing the problem device and functionally replacing it with a redundant optical device, providing an operational system. Note that as used herein, the term "optical source" is intended to refer to a place from which optical energy emanates. It need not generate the optical energy itself For example, an optical connector input can be considered an optical source. It will be appreciated that functionality criteria can be defined for a non-generator source just as it can for a generator source (such as a laser), and such criteria can depend in part on the functionality of the ultimate generator source.

FIG. 3 illustrates an alternative configuration, another optical routing structure in which the device bar 302 incorporates both primary and redundant devices. In this example, each emitter from the device bar 302 is checked to find out if it is operational or defective. If the device diode is operational, a connecting element 304 is placed/aligned such that light output from the respective device is redirected to a respective one of the output waveguides 312. In the event that a defective device diode (such as 310) is encountered, one of the redundancy device diodes 306 is utilized, and its output is redirected via a redundancy connecting element 308 to ensure its light output follows the path that would have been taken by the defective device. If no connecting element is placed to connect the defective diode 310, any residual emission (which may be undesirable) may be guided to a separate structure (not shown) for absorbing or otherwise isolating the residual emission.

It will be appreciated that in the embodiment of FIG. 3, no distinction need be made between "primary" sources and "redundant" sources. They are all simply "sources", some of which are functional and others of which may not be functional. Redirectors are placed at selected intersections in the redundancy cross-connection array, based on information as to which of the sources are functional, such that each of the optical output waveguides are coupled to receive optical energy from a respective functional one of the sources.

There are more sources than output waveguides, and it is possible (indeed, likely) that there are more functional sources than output waveguides. In the latter case, one or more functional sources will be unused. There is no requirement that the functional sources be used in any particular sequence (for example, left-to-right) relative to the output waveguide, except that it is desirable that the ultimate relationship between sources and output waveguides be known so that control circuitry can apply signals to the correct source when it is desired to produce optical energy output signals on a given one of the output waveguides.

Once again, the connecting elements 304 and the redundancy connecting elements 308 may be formed by conventional processing techniques including, but not limited to laser ablation. In this embodiment every output waveguide has a connecting element, so each may have a similar amount of additional optical loss, producing a uniform connection.

The embodiment illustrated by FIG. 3 shows an architecture in which the equid-spacing of the output guiding structures can be maintained, despite the addition of the redundancy connecting elements and their associated guiding structures. In the embodiment shown, the redundancy sources are shown at one end of the laser bar.

Figure 23:
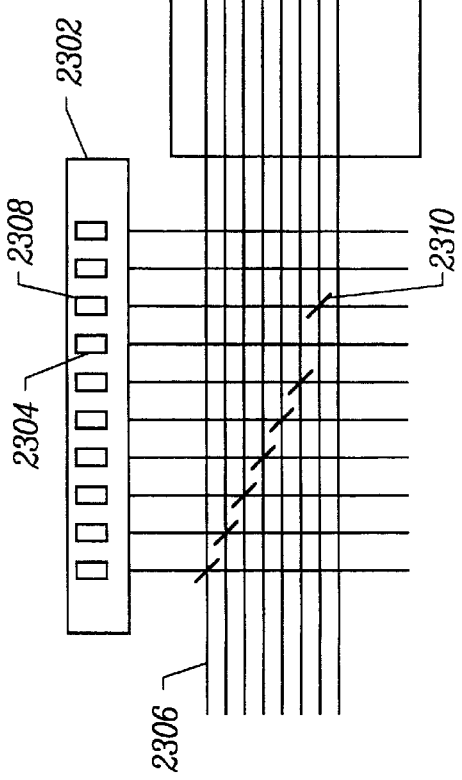
FIG. 23 illustrates another redundant optical connection system according to the invention.

Referring to FIG. 23, it can be seen that the device bar 2302 incorporates one dead laser diode 2304. In this particular example, each device from the device bar 2302 is checked to find out if it is operational or defective. If the device is operational, a connecting element 2306 is placed such that light output from the respective device is redirected to its associated output waveguide. In the event that a defective diode is encountered, no connecting element is placed to direct light to its associated waveguide. Instead, the next available operational device 2308 is utilized, and its output redirected via a connecting element 2310 to ensure its output follows the path to the next primary output guiding structure 2312. In this manner coupling of optical energy in a one-to-one correspondence from an input to each required output may be achieved. This means that one and only one input is connected to one and only one output, except for small terms such as crosstalk that are minimized by design but that may not be possible to eliminate entirely. A one-to-one structure is to be distinguished from a one-to-many (or a many-to-one) structure wherein a portion of the channel energy emerging from one input may show up usefully in many output waveguides or channels (or many portions of optical energy emerging from many sources may show up usefully in one output). Communications structures are typically one-to-one structures because it is desired that the data encoded into a single source be transmitted to a desired destination where it can be interpreted without confusion from extraneous data. "One-to-one" structures as used herein include wavelength-encoded waveguide networks (e.g. wavelength division multiplexed or WDM networks) within the definition of a one-to-one correspondence provided that on an individual data-stream basis there is provided an essentially unique pathway for that data to flow from a single source to a single output. This interpretation is maintained from the data standpoint even though a WDM network may provide a many-to-many correspondence from the point of view of optical energy flow.

In this manner, not only is the equid-spacing of the output waveguide is maintained, but functional sources are used in a left-to-right sequence, in which there is no real distinction between the primary and redundancy sources. The only additional requirement is that additional devices be provided to ensure there are sufficient operational devices to connect to each successive output guiding structure. It will be apparent that this method is not only suitable for devices in which the output waveguides are equally spaced apart, but may also be adopted for systems in which the spacing of the waveguides is unequal but nevertheless predetermined by the application in question.

In the devices described above, each device emitter is connected to a respective guiding structure. If one device emitter is non-functional, another is used to replace its functionality. Physically, the waveguide paths exist whether the device emitter functions or not.

FIG. 4 illustrates an optical routing device in which the physical connections 402 between the light sources 404 and the light guides 406 do not exist until the final product is produced. In the preliminary form of the device, there is effectively a gap region 412 between the inputs to the light guides 406 and the outputs of light sources 404. The gap region is an area where no channel waveguides are yet defined. Typically, there will be a planar waveguide in the gap region. This will be the case in those devices where the channel waveguides are formed in two steps, by first fabricating a planar waveguide and followed by modifying the planar waveguide to form channel guides. In this example, the device emitters 404 are not fully connected or coupled across the gap region to the light guides 406, until a later step in manufacturing. During that later connecting step, depending on whether it is functional or not, each device emitter output is connected to the input of the next available optical guiding structure. As in previous embodiments, the light sources 404 may ultimately be integrated into the substrate 410, it may be coupled to the connections 402, coupled via coupling means 408 to improve coupling efficiency, or connected via some other means. In one embodiment, the sources 404 are located on a bar 414 that is attached to the substrate 410 by one of the techniques described above with respect to FIG. 1. The preliminary form of the device includes waveguide stubs in the substrate 410, on the source-side of the gap region 412. There may be one stub aligned with each of the sources 404, or fewer to allow for an average (predetermined) number of nonfunctional emitters, and to minimize the curvature and length of the connections 402.

The connections 402 from the emitters 404 to the light guides 406 can be accomplished by several means. One such means for defining the connection 402 is by photo definition. Photo definition can be described as a method of modifying the index of refraction locally where material is exposed to light. Photo definition may be used to produce light guides and other patterns of elevated or depressed index of refraction by irradiating the body with focused light that is scanned across the surface, or by imaging a mask pattern. Depending on the material, ultraviolet light is most often used, but other wavelengths may also be effective. In this embodiment, it is the production of irreversible index of refraction changes that is desirable. This process is limited by the difference in refractive index that can be attained, unlike ablation or RIE (see below).

Figure 4A:
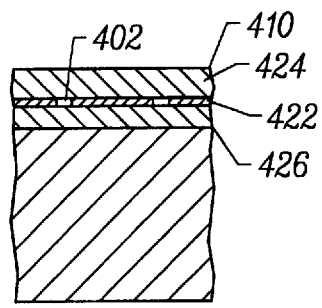
FIG. 4A is a cross-sectional view of the substrate of FIG. 4, taken along A—A of FIG. 4.

In one such embodiment one desires to obtain a photo-defined channel waveguide. FIG. 4A shows a cross-sectional view of the substrate 410, taken along A—A of FIG. 4. The planar waveguide is established by the layer structure which provides an increased index of refraction in the layer 422 relative to the upper and lower layers 424 and 426. With this structure, vertical optical confinement is provided so that light may propagate in any direction within the plane of the device. To produce a channel waveguide, one must define a direction for propagation locally such that light is confined to that single direction. A photodefined channel structure is imposed upon the planar structure by exposing it to a patterned illumination. The process of photo definition depends on whether the material being exposed increases or decreases its index upon exposure.

If the index is increased by exposure, a single elongated region is exposed to form the channel waveguide along and within that region. The ends of the region are aligned with the desired input and output direction and location, and the dimensions and fabrication process conditions are adjusted as is known in the art to produce the desired waveguide confinement so that the resultant optical mode dimensions will approximately match the mode dimensions of the connecting waveguides, namely the light guides 406 and the waveguide stubs in the substrate 410, on the source-side of the gap region 412.

If the index is decreased by exposure, the waveguide may be created by exposing two elongated regions adjacent to each other and alongside but outside the region of the desired waveguide confinement. Again, the ends of the regions are aligned with the desired input and output structures, and again the alignment is done so that the location and direction of the mode matches with the location and direction of the modes in the input and output structures. Again, the dimensions and fabrication process conditions are adjusted to produce the desired waveguide optical mode dimensions.

The fabrication process may include photo exposure followed by thermal treatment (and flood exposure) as described by B. L. Booth in "Polymers for Lightwave and Integrated Optics" (incorporated by reference herein), and other process steps may also be required by the material system selected for the device. Polyguide is an example of a system that increases its index of refraction with exposure. An example of a material that decreases its index of refraction with exposure can be found in Appl. Phys Lett. 69 (8), Aug. 19, 1996 (incorporated by reference herein). The photosensitive material may be incorporated as any combination of core and cladding, provided that the core and cladding layers continue to provide their function of vertical mode confinement, and provided that the magnitude of the photoinduced index change as experienced by the propagating optical beam is sufficient to confine the mode within the desired photodefined channel.

In some systems, for example in displays, one step in the process may be to flood expose the patterned structures to fix the established patterns and prevent any future changes in the structure. In this situation it is important to ensure that all areas that may need to be photodefined at a later stage, (such as region 412), are masked during any prior flood-exposure step, to ensure that the material is still able to react to the ultraviolet light in the desired fashion. In this kind of process, in the preliminary form of the device, the regions of the substrate that include the output waveguides 406 are no longer photosensitive, whereas the gap region 412 remains photosensitive.

Two other waveguide definition means for defining the connections 402 work by ablation: laser ablation and Reactive Ion Etching (RIE). In laser ablation, an intense laser beam may be focused and scanned across the substrate according to a desired pattern, or it may be passed through a mask that is then imaged to the substrate. In RIE, an intense ion beam may be focused and scanned across the substrate, or a mask may be applied directly to the substrate. In both techniques, the underlying material is ablated away, leaving behind a ridge that defines the channel waveguide region. In the scanned ablation approaches, the information defining the desired connections can be used to control the scan of the ablating beam to produce the desired structures 402. In the masked ablation approaches, a series of different waveguide connection structures may be present on the mask, and the mask may be automatically apertured and aligned to select the desired structure for replication in/on the device.

As stated earlier, this particular embodiment, as illustrated by FIG. 4, illustrates an architecture in which the physical connections between the light sources 404 and the light guides 406 do not exist until the final product is produced. This architecture enables one to eliminate a source of loss that is evident in the previously described embodiments, illustrated by FIGS. 1, 2 and 3. In both FIGS. 1 and 2, redundancy waveguides cross-connect with another set of primary waveguides. The existence of these crossing waveguides is a source of loss or attenuation to any light propagating along any of the waveguides, whether they be primary or redundancy waveguides. In FIG. 3, the structure dictates a crossed waveguide arrangement throughout, and hence dictates a certain amount of loss will be encountered. The number of waveguides that a light beam has to cross, ultimately dictates the level of energy that will be lost and consequently reduces the maximum power level that is attainable at the ultimate destination.

Figure 20:
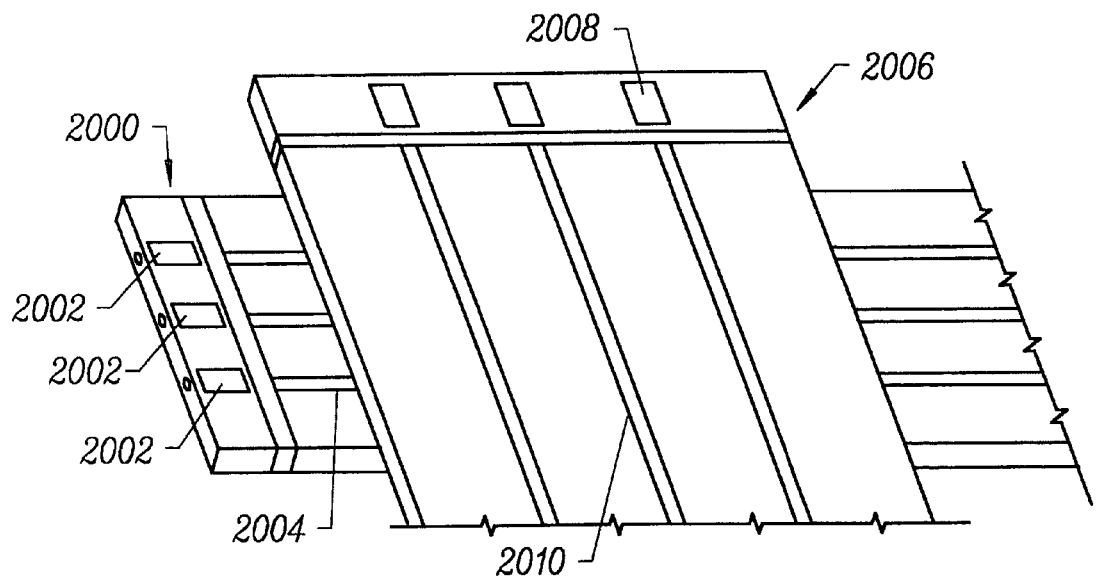
FIG. 20 illustrates another redundant optical connection systems according to the invention.

FIG. 20 illustrates an alternative configuration which includes the redundancy devices 2002 and their associated guiding structures 2004 on a separate plane to the output waveguides 2010. In this particular arrangement, the two sets of waveguides 2004 and 2010 are orthogonal to one another, and do in fact "cross" or "intersect", but not in the same plane. The term "cross" or "intersect" as used herein includes those cases in which the guiding structures pass by each other with a certain minimum distance of separation.

Figure 21:
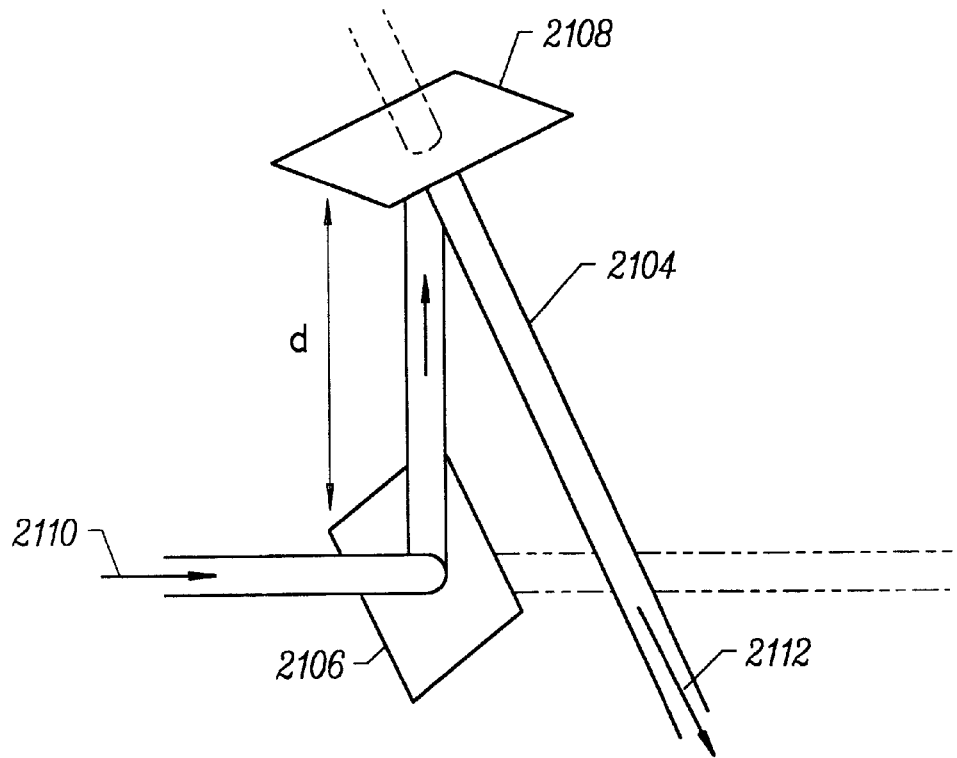
FIGS. 21–22 show detailed embodiments of reflector arrangements that may be used in FIG. 20.

In such an arrangement, it is necessary to guide light from one of the redundancy emitters 2002 into the required guiding structure 2010, which may necessitate the use of mirrors, reflectors, or other such diverging or coupling devices. FIG. 21 shows an exploded schematic view of such an arrangement. In this example, only two guiding structures are shown, one guiding structure 2102 emanating from the redundancy device, the other 2104 emanating from the primary device. The light beam propagating along 2102 is required to be redirected to propagate along guiding structure 2104, as illustrated by arrow 2112. The arrangement shown illustrates a first mirror 2106 placed in a position and at an angle to divert the light propagating along 2102 out of that plane, and into the plane of guiding structure 2104. The second mirror 2108 is placed in a position and at an angle to divert the light that has now reached the plane of the guiding structure 2104 along the guiding structure 2104 itself, as illustrated by arrow 2112. Depending upon the distance d between the two planes, the additional waveguide shown in FIG. 21 as extending between the two mirrors 2106 and 2108 may or may not be required. If the distance d between the mirrors is smaller than about one Rayleigh range, no additional waveguide is required.

Figure 22:
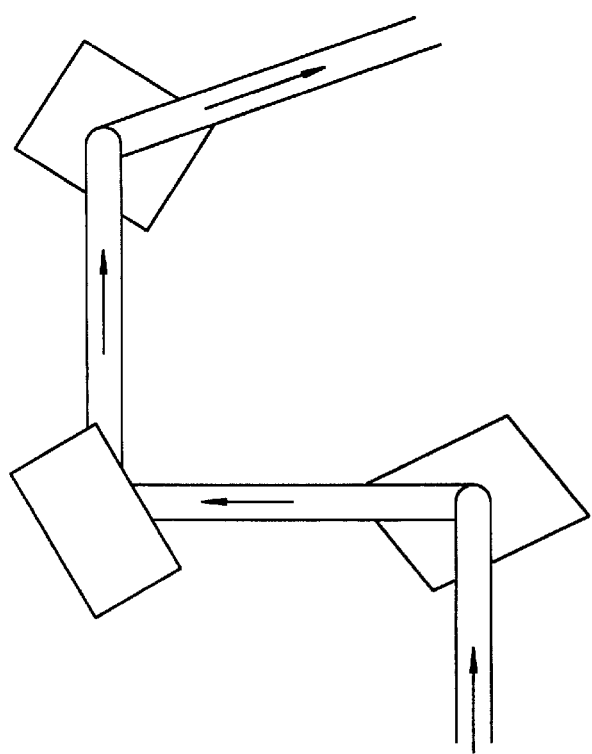

The configuration shown in FIG. 21 wherein the top-view projection of the waveguides crosses at right angles, uses of a pair of turning mirrors that will produce a polarization flip. For polarization-insensitive devices, this may not be a problem, of course. If the waveguides intersect at some other angle such as 45 degrees in top-view projection, a polarization rotation is created by the two mirror combination. Some light sources such as strained-active-layer diode lasers emit preferentially in TE polarization. If a specific polarization is required in the waveguide 2104, such as TE polarization (with the electric vector pointing in the plane of the device), a non orthogonal crossing angle might be selected to maintain significant TE polarization. Other methods might also be implemented for maintaining the desired polarization, such as using three mirrors to connect the waveguides as illustrated in FIG. 22. Again, if the distances between the mirrors are small compared to the distance required for the beam to diffract significantly, no additional waveguides need be provided between the mirrors. As an alternative, a waveguide segment may be provided during manufacturing along one of more of the intermediate segments of optical path between the waveguides 2102 and 2104.

In the embodiment illustrated by FIG. 20, the two sets of guiding structures 2004 and 2010 "cross" or "intersect" but not in the same plane. It will be apparent that there are architectures which are not limited to only two planes. Other architectures, for example, may utilize the two sets of guiding structure in different planes from one another, but not necessarily orthogonal to one another. Another architecture may provide an arrangement along the lines of that illustrated by FIG. 3, in which all the lasers, both the primary and redundancy lasers, are located on the same bar, and as such can be found in the same plane. In this arrangement, either the primary waveguides or the crossing waveguides could be in a second plane.

In all the examples given above, optical redirectors are formed by introducing a structure into the device that was either not previously there or was there but in a dormant form. Optical redirectors are elements or a combination of elements that redirect optical energy from the a first direction to a second direction. In some instances this can be the creation of an absolutely new structure, in other cases it can be the activation of a structure that was present in a dormant state in the preliminary form of the device. Depending upon the end product, the activation of a structure can be temporary or permanent, by use of a dynamic or static activation process. For example, the introduction of a permanent structure could be provided by employing the laser ablation process, whereas the introduction of a temporary structure could be provided by utilization of a controllable electro-optic switch.

By permanent, we mean that the structure endures for a time long compared to the specific application, compared to temporary, where the duration of the structure is short compared to the useful duration of the application. An example of a temporary structure is an electro-optic or thermo-optic switch that provides an optical connection between waveguides; the connection is lost when the device is powered down. Some applications may require the permanent optical redirection to last for years, while for others, a structure is permanent even if it may only endure for months.

Figure 5:
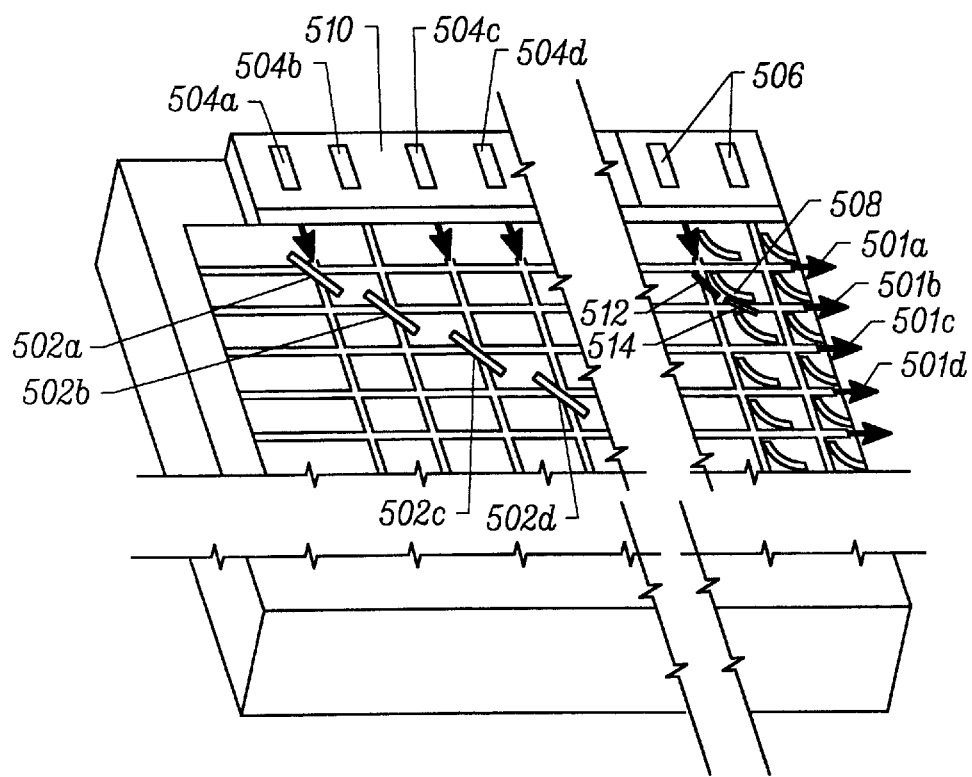

FIG. 5 illustrates an embodiment in which the output of each primary source 504a, 504b, . . . (collectively 504) on a device array 510 is redirected to its associated output guiding structure 501a, 501b, . . . (collectively 501) by a respective connecting element 502a, 502b, . . . (collectively 502). In one version of the method, the redirectors 502 are present in the preliminary form of the device, whereas in another version of the method, they are introduced only at a later stage. As for the previously described embodiments, each source 504 output from the device array 510 is tested to find if the device is operational or defective. If it is operational, its output will successfully be redirected by its connecting element 502 to an associated guiding structure 501. As shown, emitting devices 504a, 504c and 504d are operational, and connecting elements 502a, 502c and 502d successfully route the output from the devices to associated guiding structures 501. Emitting device 504b is defective, and hence its associated guiding structure needs to receive its light input from the output of one of two redundant emitting devices 506, with the aid of a coupling element 508, which is shown in more detail in FIGS. 6, 7 and 8. It will be apparent to those skilled in the art that in this case, the presence of connecting element 502b is optional and it may be omitted if so desired during the manufacturing process.

The two redundant device emitters 506 in FIG. 5 are able to direct their output to any of the output guiding structures 501. In this embodiment, there is a small permanent secondary guiding structure 508 positioned between each of the redundant device emitters 506 and each of the guiding structures 501. For clarity of illustration, only one of the secondary guiding structures 508 is fully shown in FIG. 5. These small permanent guiding structures 508 can be fabricated using conventional fabrication techniques during the fabrication of the other guiding structures 501. Each permanent guiding structure 508 is effectively a coupler, with the coupling input 512 and output 514 yet to be defined. Once the coupling input and output are established, the small guiding structures are then capable of guiding light from a redundant device 506 to one of the guiding structures 501 (see FIG. 7).

This particular embodiment focuses on the concept of coupling to achieve the guiding of light from a redundant device to one of the guiding structures. The coupling achievable is dependent upon many factors including, but not limited to, the guiding structures, materials, mode requirements (single or multi-mode), and the set of processes or fabrication steps selected, among other issues, to facilitate the desired result. These limitations for the achievable coupling apply not only to this embodiment, but to the other embodiments described.

In the embodiment illustrated in FIG. 5, the connecting elements 502a, 502b, etc. are located in positions such that the loss experienced by the light as it travels through the various guiding structure is minimized. Light output from source 504a travels until it encounters connecting element 502a, where it is redirected and propagates along its associated output guiding structure 501a. Along this path, it encounters intersecting guiding structures that emanate from devices 504c, 504d, etc. Similarly, light output from source 504c travels until it encounters connecting element 502c, where it is redirected and propagates along its associated guiding structure 501c. Along its path, it will have to encounter the intersections formed by both guiding structures 501a and 501b, as well as the intersections formed by the intersecting guiding structures that emanate from devices 504d, etc. As one can see, overall, this arrangement provides for the light output from each of the guiding structures 501a, 501b, 501c, etc. to be relatively constant, since the propagation length is constant for each source.

If the connecting structures were arranged such that light emanating from source 504a propagated along its associated guiding structure and encountered the intersections formed by guiding structures 501a, 501b and 501d before being redirected by a connecting element, the light would also have to encounter the intersections formed by the intersecting guiding structures emanating from devices 504b, 504c, 504d etc. Whereas light emanating from source 504d could be redirected by a connecting structure almost immediately, and only have to encounter the intersections formed by the guiding structure that emanated from sources 504e, etc. It will be apparent that in this instance, the light output from guiding structures 501a, 501b, 501c, etc. would no longer be constant since the propagation lengths as well as the number of intersections encountered for each source would differ.

Some of the various architectures that may be considered in the design of a redundancy connection system have now been discussed. The following describes in detail, examples of several redundancy connection devices that can be incorporated into such systems.

Figures 6A, 6B:
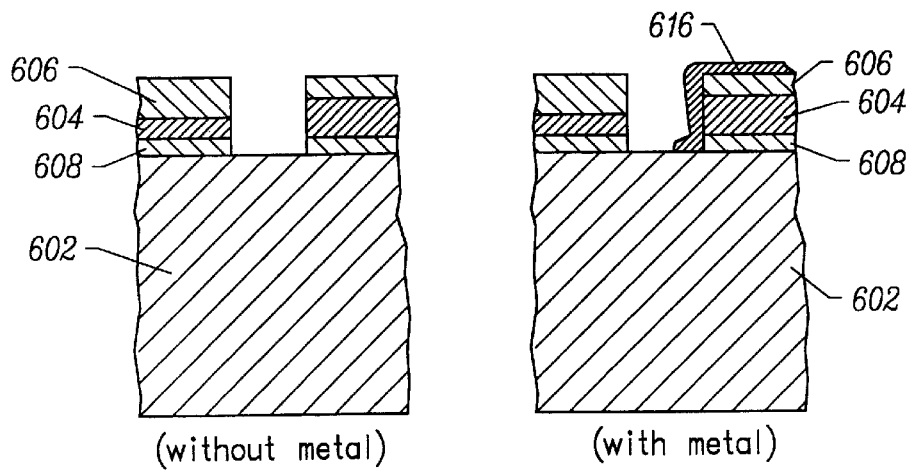
FIGS. 6A and 6B are different alternatives for a cross-sectional view of the device of FIG. 6, both taken along A—A of FIG. 6.

FIG. 6 shows a more detailed view of the arrangement for a redundancy connection device shown in FIG. 1. In this diagram, the waveguides are ridge waveguides formed on a substrate 602. The ridge waveguide is formed from a three-layer structure including core layer 604 and upper and lower cladding layers 606 and 608 respectively. The core layer 604 protrudes slightly into the upper cladding layer 606 to form a ridge which defines the waveguide. In order to enable the light propagating along one guide 610 to be re-directed into a 90 degree crossing guide 612, a mirror 614 is formed at the junction of the two guides by means of excimer laser ablation. In the process, a portion of the upper cladding and core of the structure is removed to create a reflective surface by removing material at 45 degrees relative to the optical axis of the waveguide 610 and perpendicular to the surface. Thus a material-air interface is provided such that light propagating along guide 610, on reaching the material-air interface, is redirected to propagate along guide 612. A cross-sectional view of this embodiment can be seen in FIG. 6A. In another embodiment, a metal coating 616 can be applied, as shown in FIG. 6B, thus providing a more efficient reflector that can be overcoated with additional layers.

FIG. 7 shows a more detailed view of an arrangement in which the redundancy connection system incorporates additional permanent guiding structures at an intersection, such as 508 in FIG. 5. In this arrangement, a permanent guiding structure 708 and coupling means, illustrated by 710 and 712 are shown.

Light 714 from a redundant emitting device travels along its associated guiding structure 716. Guiding structure 718 is an output waveguide which, for the purpose of this explanation, is aligned at its input (not shown) with an optical source that is not operational. Prior to fabrication of coupling structure 710, the majority of light 714 passes by the structure 708, traverses the intersection with guiding structure 718 and continues along the guiding structure 716. To accomplish the connection to guiding structure 718, a structure 710 is fabricated to couple optical energy out of the guiding structure 716 and into the guiding structure 708. Another coupling structure 712 is also fabricated to couple optical energy from the guiding structure 708 into the output waveguide 718 in a downstream direction. The light 714 will then begin its journey along path 716 until it is coupled out via 710 into the permanent guiding structure 708. The light will then be guided by that structure until it encounters the coupling structure 712, coupling the light into guiding structure 718. The guiding structure 708 and its junctions with the waveguides 716 and 718 are designed such that absent coupling structures such as 710 and 712, optical energy propagating in either such waveguide will propagate past these junctions with substantially no loss. As used herein, the phrase "substantially no loss" refers to a loss that is negligible in the particular application for which the overall device is intended. Waveguides 716, 708, and 718 may be fabricated using conventional techniques as ridge waveguides, photodefined waveguides, or other guiding structures. The coupling structures 710 and 712 can be defined using conventional fabrication techniques including but not limited to photodefinition.

The arrangement shown in FIG. 7 shows a permanent guiding structure 708 which has a significant bend to effectively guide the light through an almost 90 degree turn. Limitations on this embodiment are governed by the loss of light experienced by utilization of both the couplers and the guiding bends. An alternative to this, would be to replace the single curved waveguide structure 708 by three components comprising of two separate sequentially disposed permanent guiding segments and a reflector at their common junction, each separate guiding structure being less curved than the single curved waveguide 708 illustrated in FIG. 7. If coupling structures such as 710 and 712 are in place, then the light 714 will begin its journey along path 716 until it is coupled out via 710 into the first segment of guiding structure, and then be guided by that segment until it encounters the reflector. At this point, the light is reflected into the second segment of guiding structure, and is guided by that segment until it encounters the coupling structure 712, which couples the light into guiding structure 718. It will be appreciated that the guiding structure 708 can, in fact, be replaced by any number of sequentially disposed waveguide segments, each being less curved that the guiding structure 708 shown in FIG. 7 (or even being straight), and each having a reflector at its downstream end to reflect optical energy into the upstream end of the next segment.

FIG. 8 illustrates yet another embodiment of a connecting element that may be employed, a parallel coupler arrangement. It is known in the art to couple two waveguides together by bringing the guides into close parallel proximity and allowing coupling to occur through phase coherent energy transfer. The distance between the two guides must be small enough that the evanescent tails of the guided modes overlap. In order for energy transfer to occur between the two guides, they should have substantially identical propagation constants, or an applied grating to supply the missing momentum increment for the coupling. Thus, the indices and the dimensions of the waveguides should be very carefully controlled to provide matching propagation constants. In addition, the interaction length must be carefully chosen for optimum coupling. By choosing an appropriate separation between the waveguides and the interaction length, all the light incident on one of the waveguides exits in the other via distributed evanescent coupling.

In this embodiment, light guided along guiding structure 802 is coupled into a first parallel coupling waveguide segment 804, which guides it into the permanent guiding structure 806. The guiding structure 806 guides the energy through the curve, and into a second parallel coupling waveguide segment 808, where it is coupled into the output guide 810. Each of the parallel coupling segments is fabricated at a later step in the fabrication process than the permanent guiding structure, by utilizing a process such as photodefinition. Once again, it is desirable that absent the parallel coupling segments 804 and 808, the presence of the permanent guiding structure 806 introduce substantially no loss in the optical energy propagating in waveguides 802.

It is preferred that the permanent guiding structure 806 have low loss as described earlier. A sequential design as described above with respect to FIG. 7 may be of assistance here. In addition, it is desirable that the ends 812 of the structure 806 be far away from the guides 802 and 810 if possible, to avoid diffractive effects on the modes propagating in the guides 802 and 810. Furthermore, the parallel coupling segments 804 and 808, when present, should to be close to the guides 802 and 810 respectively, in order to allow efficient coupling, and long enough to allow efficient coupling to actually occur, close to 100 per cent being the ideal. Dimensions such as the length of the parallel coupling segments 804 and 808 are determined partially by the ideal length to attain 100 per cent coupling, and the limitations set by the overall system itself, such as the distance to the next guide, and hence compromise is often required.

An alternative to the embodiment described above, is one in which the photodefined structures, rather than defining a region of elevated refractive index, instead are defined as two parallel regions of depressed refractive index. The two parallel photodefined regions define a waveguide in the channel between them.

Other implementations of connecting elements are known to those skilled in the art. Examples are dynamically controllable total interval reflection (TIR) switches, and the use of electrodes/switches to guide the beam to its desired location. TIR switches are described in U.S. Pat. No. 5,544,268 "Display Panel with Electrically-Controlled Waveguide Routing" which is incorporated herein by reference.

FIG. 9 shows a schematic example of a electro-optic, thermo-optic, acousto-optic or magneto-optic switch, in which both crossing guides 902 and 904 are formed in an optical material for which the refractive index varies with the variation of electric field, temperature, strain, magnetism or other such property, Taking temperature as the variation control in this example, a heat generator 906 is provided in the vicinity of the branching portion of the waveguide path, the heat generator shown in the form of an electrode, which receives its control input from a control unit 908. The electrode may be formed with an adequate length and width on a portion of the upper surface of the optical waveguide. The control unit 908 is able to provide the required signal to the electrode/heat generator 906, in order to produce a temperature gradient in the optical material. The temperature gradient gives the optical material a refractive index gradient, by which a light beam propagating through the waveguide 902 is deflected out of the waveguide 902 and into the arrangement 910 of waveguides and mirror. The electrode/heat generator 906 at the other end of the arrangement 910 is activated to deflect the light emerging from the structure 910 into the waveguide 904.

It is possible to manufacture laser diode arrays with the laser emitter center-to-center spacing much greater than 50 $\mu$m, say 200 $\mu$m. However, alignment along the entire length of the diode array becomes more difficult as the length of the array increases, and the cost grows with chip area. In an application such as a display, the center-to-center spacing between row or column waveguides within the waveguide array may therefore be considerably greater than the desired emitter spacing of an economical multi-source bar. In communication systems, the connector terminations at the output end of the waveguides usually require spacings in the region of 250 $\mu$m to 1000 $\mu$m. For these reasons, it is often necessary that the light output from the emitters be fanned out to the waveguide spacing determined by the architecture of the device in question. A fanout architecture may be achieved in many ways known in the art, including for example, by connecting together straight waveguide segments, potentially with additional structures at the junctions between segments to increase the efficiency of the coupling between segments. Such additional structures might include mirrors, gratings, prismatic structures etc. Another way in which a fanout architecture can be implemented is by the use of waveguide curves, as illustrated in FIGS. 10 to 13. These embodiments show how redundancy connecting elements can be incorporated into devices that include multiple fanout waveguides.

Figure 10:
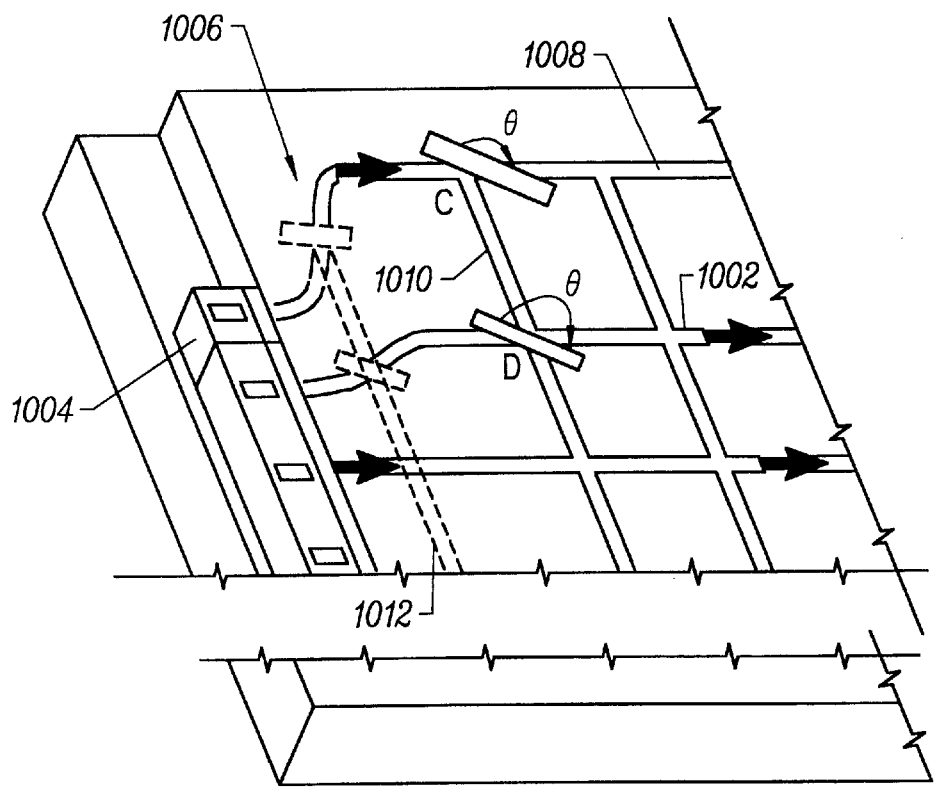

FIG. 10 illustrates the inclusion of a fanout region 1006 in an embodiment such as that of FIG. 1. Referring to FIG. 10, in order to redirect the beam of light from a redundant waveguide 1008 into a waveguide 1002 that requires it, light can be redirected out of waveguide 1008 at point C and into a redundancy cross-connection waveguide 1010, and then out of the redundancy cross-connection waveguide 1010 at point D into the output waveguide 1002. It is possible instead to place the redundancy connecting structures within the fanout region 1006, using a redundancy cross-connection waveguide 1012 indicated by broken lines, but this may cause undue complexity in the manufacturing process. In situations where two or three lasers are non-functional, if the area chosen to place the redundancy connecting elements is on the fanout portion of the waveguide, each reflector typically would have to be placed at a different angle from the others. However, if the reflectors are placed on parallel sections of waveguide, the angle of each redundancy connecting element is the same, no matter how many of them are required. This facilitates manufacturing of devices incorporating such a redundancy switching device.

FIG. 11 shows a device incorporating two light emitting bar arrays 1102 which are coupled via an interfacing means 1104 into the optical guiding structures 1106 utilizing a fanned-out arrangement of guiding structures. In the event that any of the light emitting devices 1114 is defective, light from one of the redundancy emitting devices 1108 is re-routed, via redundancy connecting element 1110 to ensure that all the optical guiding structures 1106 receive a light output. In this system, only one redundancy device bar 1112 is required to meet the needs of several light emitting bar arrays 1102. It can be seen that in the arrangement of FIG. 11, the waveguide fan-out achieves equal output waveguide spacing not only across all the output waveguides associated with emitters on a single bar 1102, but across all the output waveguides associated with emitters on either bar 1102.

Figure 12:
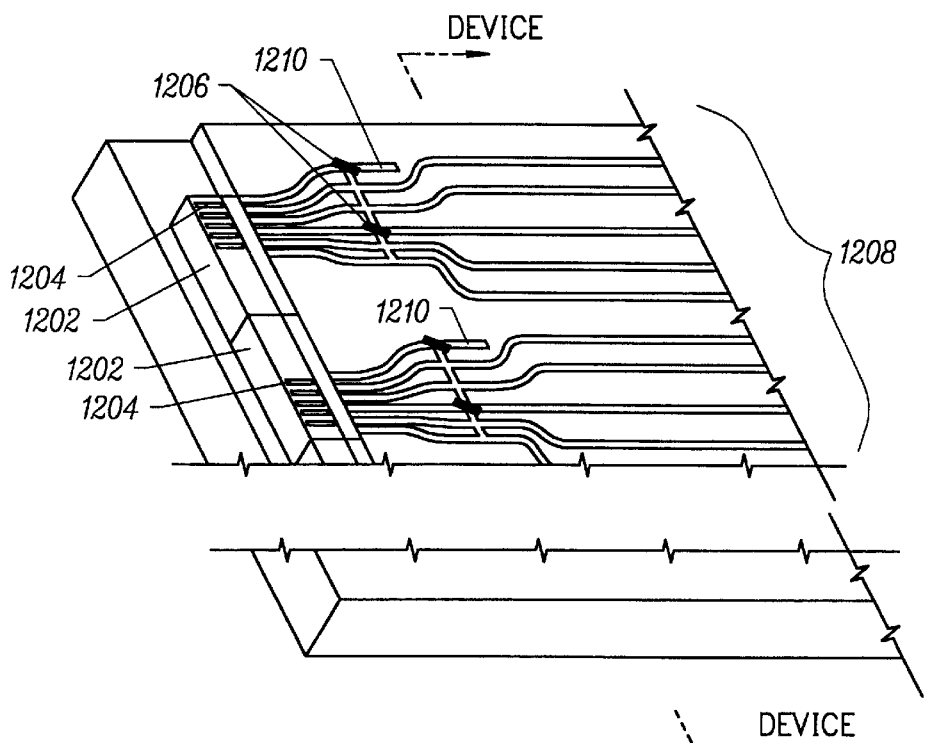

FIG. 12 shows a device incorporating two light emitting bar arrays 1202, each including one redundancy emitting device 1204, and each displaying a dual fan-out geometry. The compact system shown uses the first fan-out of guiding structures to accommodate the placement/alignment of redundancy connecting elements 1206, and the second fan-out of guiding structures to establish the geometry required for the equi-spaced guiding structures 1208. Again, it can be seen that the arrangement of FIG. 12 achieves equal spacing across the output waveguides associated with emitters on either bar 1202, and in spite of having reserved at least one emitter 1204 on each bar at the waveguide 1210 associated therewith, for redundancy purposes. In this arrangement, the guiding structures 1210 associated with the redundant emitting devices 1204 are much shorter in length than the output guiding structures 1208 which extend the whole length of the device.

FIG. 13 shows a device in which the redundant emitting devices 1302 are interspersed among primary emitters within a laser diode bar 1304. This arrangement enables the equi-spaced output guiding structures 1306 architecture to be attained with only a single fan-out geometry, and hence facilitates both easier fabrication and a reduction the longitudinal dimension of the final device. Again, it can be seen that several of the redundancy waveguides terminate without a connection to the application device.

Another way in which the predetermined spacing of the output waveguides can be maintained was illustrated in FIG. 23, described earlier. In this embodiment both the sources and the output waveguides are illustrated as equi-spaced, but the spacings of the individual sources do not necessarily equal the spacings of the individual output waveguides. This particular arrangement allows a predetermined spacing of the output waveguide to be achieved without the use of the fan-out architecture described above. It will be apparent that the connection architecture described serves to eliminate the need for a fan-out architecture and may also serve to accommodate redundant sources.

Figure 25:
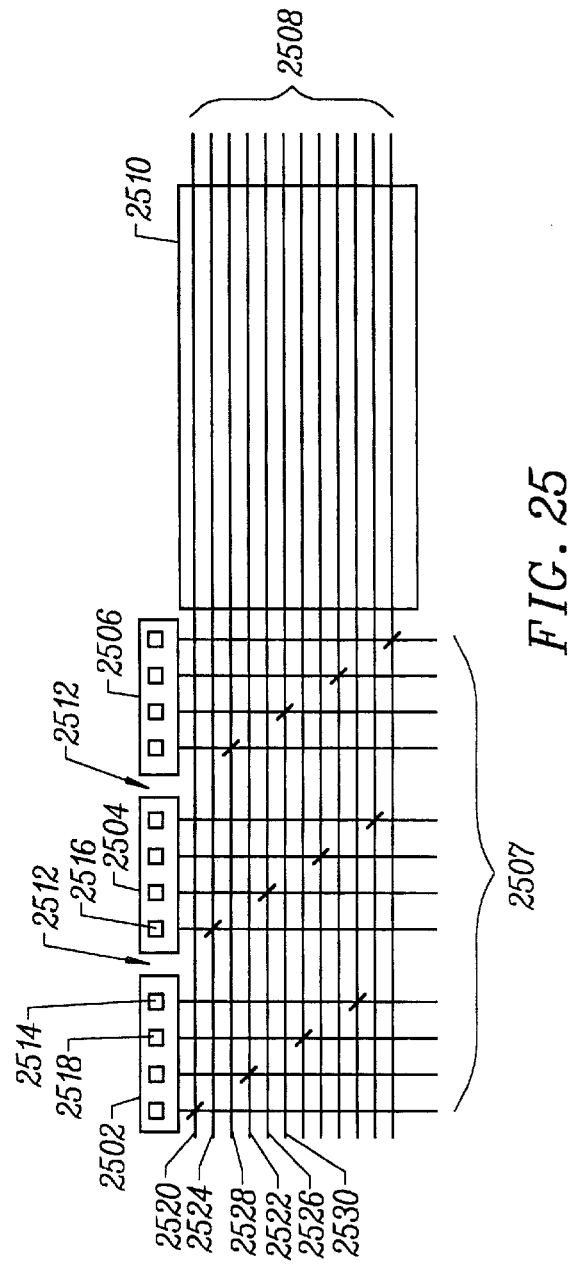

The spacing between different adjacent pairs of the output waveguides may be predetermined, but need not necessarily be the same. The same is true for the spacing between sources. For example, FIG. 23 shows an arrangement in which there is only one laser diode array shown; however, FIG. 25 shows an arrangement in which more than one such laser diode array is shown. In this arrangement, three device bars 2502, 2504 and 2506 serve to provide input to the row waveguides 2508 of a display 2510. Although the spacing between the individual lasers on each bar are shown as equal, there is a gap 2512 between each adjacent pair of the laser bars and, consequently, the spacing between the last laser 2514 on the bar 2502 and the first laser 2516 on the bar 2504 is not the same as the spacing between adjacent pairs of lasers found on the same bar, for example lasers 2518 and 2514. This particular embodiment illustrates that the predetermined spacing of the output waveguides can be maintained despite the irregularities that may occur within the spacings of the source waveguides.

Figure 24:
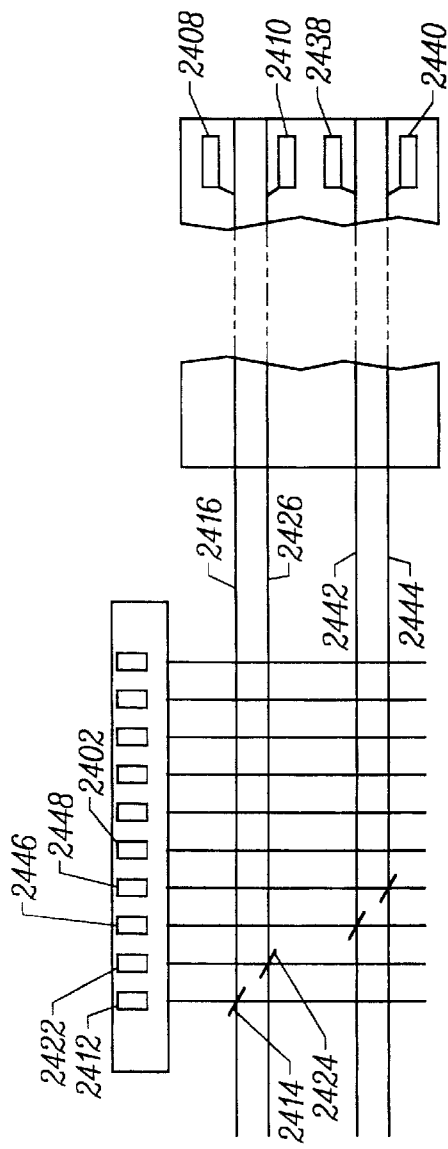
FIGS. 24–26 illustrate other optical connection systems according to the invention which may provide for redundancy.

This is also the case for the output waveguides. The spacings are predetermined, but may not necessarily be equi-spaced as illustrated in FIG. 23. The predetermined spacings may be dependent upon the application in question and the manner in which the outputs are utilized. For example, FIG. 24 shows an arrangement in which the device bar 2402 incorporates all operational source devices, serving to provide optical energy to the application structures, shown as light emitting structures 2408, 2410, 2438 and 2440 on a display. A connecting element is placed such that optical energy from the respective device is redirected to its associated output waveguide and ultimately to its associated light emitting structure. In this instance, two output waveguides 2416 and 2426 pass between application structures 2408 and 2410, none pass between application structures 2410 and 2438, and two output waveguides 2442 and 2444 pass between application structures 2438 and 2440. Optical energy from source 2412 is redirected by connecting element 2414 into output waveguide 2416 and ultimately to the light emitting structure 2408, and optical energy from source 2422 is redirected by connecting element 2424 into output waveguide 2426 and ultimately to the light emitting structure 2410. In a similar manner, optical energy from sources 2446 and 2448 is routed to light emitting structures 2438 and 2440, respectively.

It will be appreciated that in many applications, even where output waveguides are not required to be spaced apart equally, they may still be required to be spaced according to a predetermined, repeating pattern such as that shown in FIG. 24. It will be appreciated also that where the source devices are lasers, for instance, they may be more narrowly spaced apart than at least one adjacent pair of output waveguides (such as 2426 and 2442), and in many embodiments may be more narrowly spaced apart than all adjacent pairs of output waveguides. In other embodiments, input waveguides might need to be more widely spaced apart than on or more of the output waveguides. All these variations are accommodated by a cross-connection array structure such as that shown in FIG. 24. without requiring any fanout (or fan-in) region.

In an alternative embodiment, more than one output waveguide may be required to feed each application structure, and the spacings of output waveguides are altered accordingly. It will be apparent that the output waveguides in these embodiments are once again of a predetermined spacing, but the spacing pattern is predetermined by application and architecture selected. In the embodiment illustrated by FIG. 24, the pattern is a repeated pattern, but may not necessarily be so.

The concept of a cross-connection array, within which optical redirectors can be placed at selected intersections of input waveguides with output waveguides, also provides the flexibility to cross-connect input waveguides to output waveguides in a different order. That is, the spatial order with which output waveguides exit the array need not be the same, or even monotonically related to, the spatial order with which input waveguides enter the array. One advantage of this flexibility appears in applications where it is desired to spatially interleave optical energy of two or more different types in the output waveguides, but it is economical to provide the optical energy in the form of two or more laser bars, each having sources producing optical energy of only a single type. In this situation the bars may be disposed adjacent to each other at the inputs of the input waveguides, and the desired interleaving may be accomplished solely through proper placement of the optical redirectors within the cross-connection array.

FIG. 25 illustrates a schematic representation of an embodiment of the invention including three device bars adjacent one another. In this particular embodiment, the device bars could represent, for example, lasers bars which emit light of different wavelengths (emitted from laser bars 2502, 2504 and 2506, respectively). Applications for such a structure include WDM communications where the multiple wavelengths correspond to different communications channels, and displays where the wavelengths may be red, green and blue, or infrared wavelengths that can be efficiently combined to form red green and blue. Although connections are shown in a one-to-one architecture in the figures, many-to-one connections may also be useful, such as in upconversion phosphor excitation, where two different infrared wavelengths may be desired to optimally excite a phosphor. In the many-to-one geometry, two different sources are coupled to the same application waveguide, and wavelength dependent redirectors may be used for efficient coupling of several wavelengths into the desired waveguide. This particular arrangement allows a particular wavelength of light to be selected for a particular output waveguide. The arrangement shown illustrates an example in which the output waveguides 2520 and 2522 both receive their input from the laser bar 2502, emitting red light. Output waveguides 2524 and 2526 receive their input from laser bar 2504, emitting green light, and output waveguides 2528 and 2530 receive their input from laser bar 2506, emitting blue light. As can be seen, the arrangement allows the input to be selected from any one of a number of device sources interleaving red, green and blue output waveguides despite non-interleaved red, green and blue laser sources. In addition, the arrangement of FIG. 25 continues to enable the predetermined spacing of output waveguides to be maintained (avoiding fan-out), while also accommodating redundant and/or non-functional sources.

Figure 26:
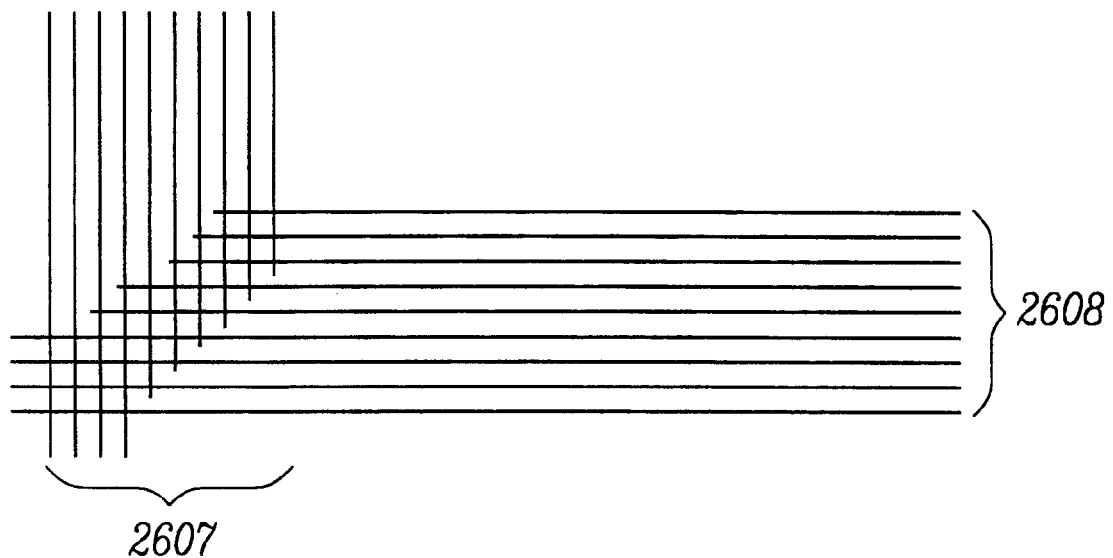

FIG. 26 shows a variation of the structure, in which any waveguide may cross only a subset of the other waveguides, whereas FIG. 25 shows that all source waveguides 2507 cross all output waveguides 2508; the source (output) waveguides are all shown to terminate after having crossed all of the output (source) waveguides. In FIG. 26, by ending the waveguides at the appropriate locations, a structure is provided wherein the upper one of the output waveguides 2608 crosses only the rightmost three of the source waveguides 2607, and the leftmost one of the source waveguides 2607 crosses only the lower four of the output waveguides 2608. As can be inferred from FIG. 26 there are many potential variations of the structure of the diagram. Other ones of the waveguides may traverse a larger or smaller number of waveguides according to the specific design that is chosen.

Figure 14:
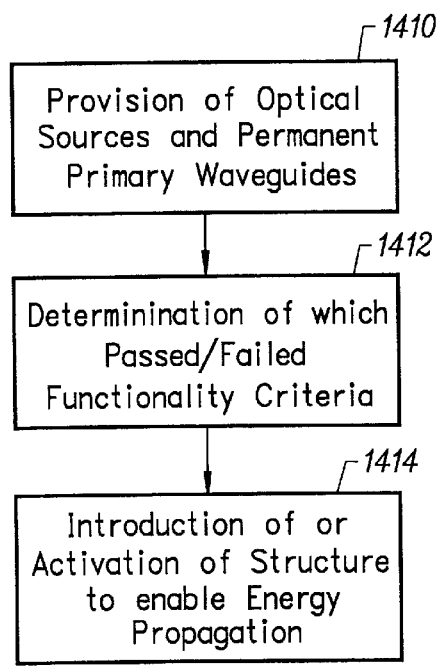
FIGS. 14 and 15 are flow charts of manufacturing processes according to the invention.

FIG. 14 is a flow chart illustrating a general method of manufacturing a multi-source optical module according to the invention. As used herein, the tern "module" is not intended to imply a separate or discrete unit, although such a unit could of course be made. The module could instead comprise merely a portion of the overall device. Referring to FIG. 14, in a step 1410, a number of optical sources and a number of primary guiding structures are provided. The primary guiding structures are capable either immediately, or with addition of couplers or other structures or processes, of allowing energy to propagate from at least the operational optical sources to all the required optical outputs. It will be apparent that these components may be acquired or fabricated as a unit or as separate components, depending upon the nature of the application and the stage of manufacture.

In a step 1412, it is determined which of the optical sources pass predefined functionality criteria. There are numerous ways in which this can be carried out once again dependent upon the nature of the application and the stage at which redundancy coupling is utilized in the manufacturing procedure. One may need to measure the functionality of each individual optical source, or it may be apparent from inspection of the device itself which sources are not functioning as desired. Alternatively, on acquisition of the sources, one may be presented with a manufacturer's test report indicating which optical sources are either functional or non-functional.

In a step 1414, structure is introduced or activated in the module to enable optical energy from the functional optical sources to propagate to each of the outputs of the module. Once again, there are several ways in which this can be accomplished within the scope of the present invention. A structure can be introduced, for example a photodefined guiding structure can be introduced as indicated by element 402 of FIG. 4, which ultimately enables optical energy to propagate to the desired location. As another example, new structure can be introduced which transfers optical energy to and/or from "helper" structures that are already present in the preliminary form of the device. For example, elements 512 and 514 (FIG. 5) can be introduced to make use of pre-existing structure 508; elements 710 and 712 (FIG. 7) can be introduced to make use of pre-existing structure 708; and elements 804 and 808 (FIG. 8) can be introduced to make use of element 806.

As a further example, the preliminary form of the device might contain preliminary structure which predisposes the device to the formation of the refractive index differences for redirecting optical energy, but such refractive index differences are not actually exhibited in the preliminary structures. Further processing then permanently activates selected ones of these preliminary structures.

As yet another example, a controllable structure such as an electro-optic switch could be activated to allow optical energy to propagate as required. In this last example the switch could of course be permanently enabled if so desired. These examples serve only to illustrate alternatives by which optical energy is allowed to propagate from the functional optical sources to the outputs, and are not intended to be exclusive.

Figure 15:
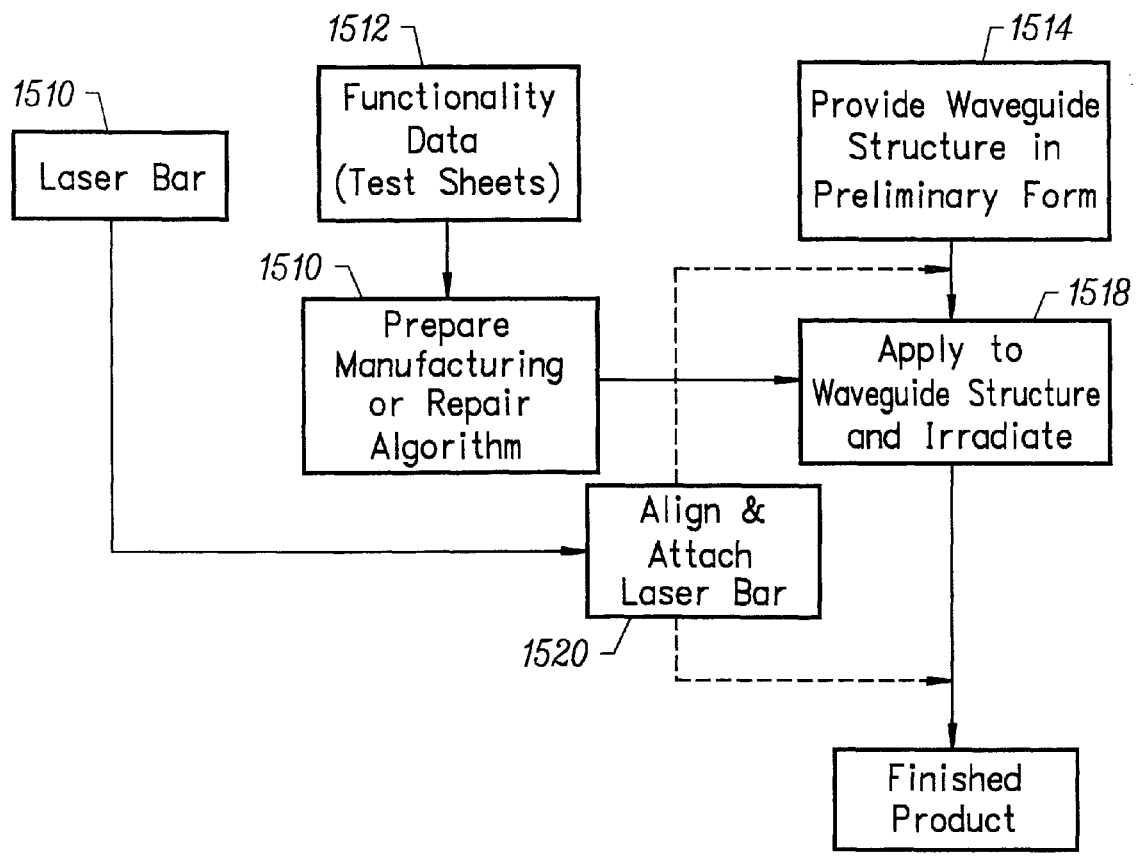

FIG. 15 is a more detailed flow diagram illustrating a method of manufacturing a multisource optical module in which the optical sources are laser diodes, and the guiding structures are optical waveguides. In this example, the module components have been acquired or fabricated in two parts, the laser bar (in step 1510) and the waveguide structure in preliminary form (step 1514). It is intended to produce a module such as that illustrated by FIG. 4. In this instance, the laser bars have been provided by an outside supplier, and the supplier has provided a functionality data report (step 1512). The functionality data may for example be provided in the form of a test data sheet indicating which of the laser diodes on the bar are not functioning to the predetermined functionality criteria, the criteria being which lasers are incapable of operation, are dead or have an output below the power level desired. It will be appreciated that providing information as to which sources fail the functionality criteria is the same as providing information as to which sources pass, since either is trivially derivable from the other.

Having received this information, it is now desirable that the waveguide structure be modified or repaired, assuming modification is necessary, to effectively allow each of the output waveguide structures to be aligned to receive optical energy from a respective functional one of the lasers. The non-functional lasers will not be used in this particular design at all. The idea is to introduce structures into the device that enable optical energy from functional ones of the sources to propagate to each of the outputs. Introduction of the structure may be by processes such as reactive ion etching, laser ablation, or photodefinition, for example. If the photodefinition process is utilized, those portions of the structure in which one wishes to form waveguides are irradiated with a focused ultraviolet beam, for a predetermined time, thereby producing the index of refraction change that is required to form the waveguide. If this type of process is employed, the method should ensure protection to all parts of the structure which are not to be irradiated. This may require simply selecting a predetermined mask to produce the required result, utilization of a computer aided design program, or even the modification and application of a mask, this list serving to provide examples only. One may then apply the photodefinition process to the waveguide structure, irradiating the structure as prescribed. The preparation of a plan for the introduction of selected structures in dependence upon the functionality data (step 1512) is illustrated in FIG. 15 as step 1516, and its application to the waveguide structure is illustrated as step 1518.

One of the final steps in the process of FIG. 15 may be the attachment and alignment of the laser bar to the waveguide structure using equipment that is known to those skilled in the art (step 1520). This process may be carried out before or after the additional structures, as indicated above, have been introduced (step 1518), dependent upon the process selected. Once this has been carried out, each one of the optical waveguide outputs will be able to receive optical energy from the introduced structure, in this particular example the photodefined waveguide segments 402. Light will thus eventually emanate from each and every optical waveguide output, in response to control signals applied to the laser sources.

Figure 16:
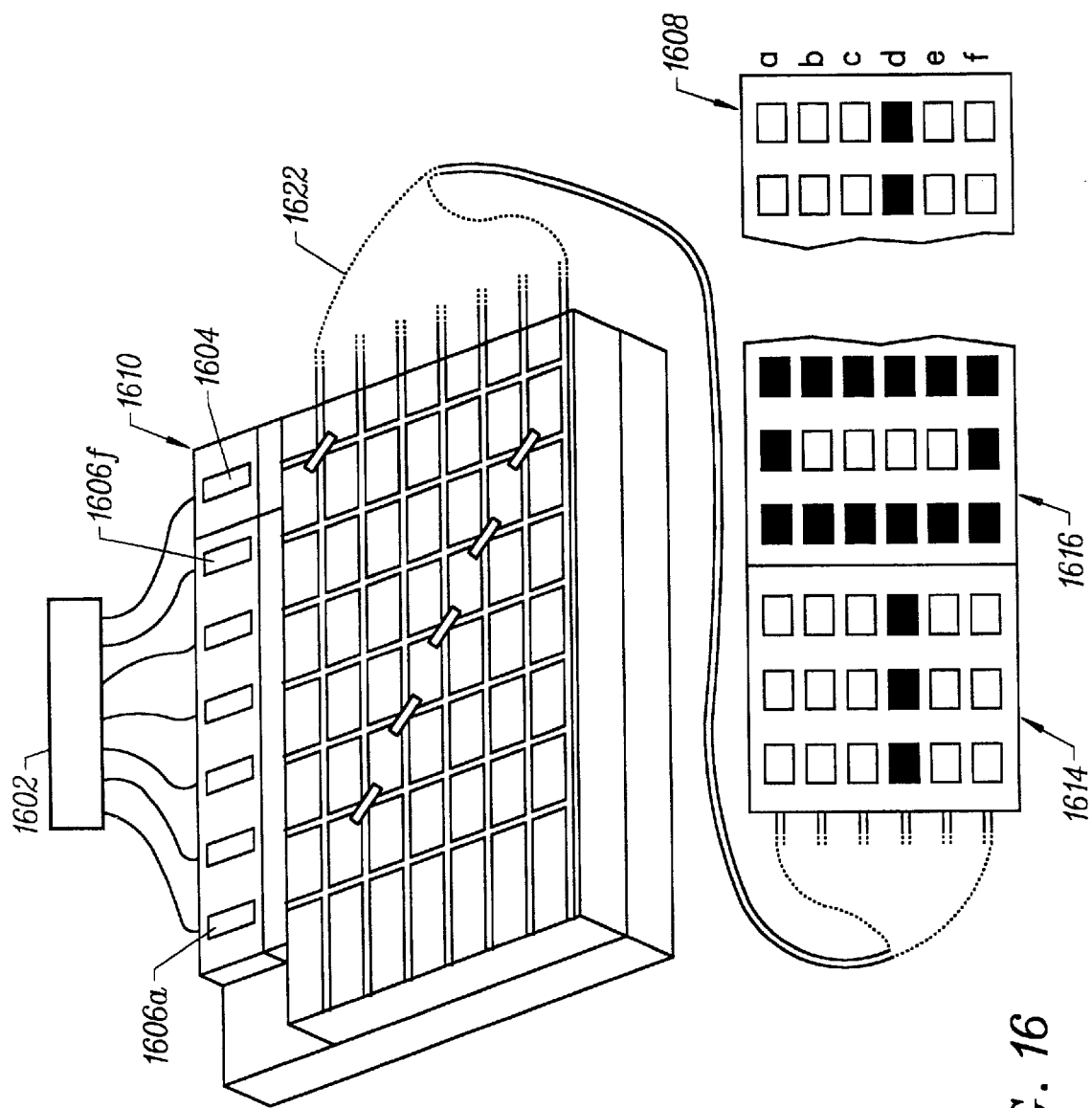
FIG. 16 illustrates a redundant optical connection system according to the invention, with outputs connected to a sign display.

FIG. 16 illustrates a redundancy coupling device in which the application structure is a connector (not shown) which connects ultimately to the pixels of a display, and the device is for the specific application of providing illumination to a display sign 1608, for example a sign indicating that a store is -OPEN- or CLOSED. The display sign has a "6 rows×3 columns" grouping of pixels associated with each character, the first character shown 1614 being a hyphen "-", the second 1616 being the character "O", and so on.

In the arrangement shown, there is an individual light source on a light bar that is associated with each row on the display. In the illustration, it will be apparent that it is necessary for each of the light sources indicated on the source bar 1610 to provide light to its associated row of the display sign in order that distinguishable words appear on the screen 1608. The light source 1606a is intended to illuminate the first row of the display, row a, the light source 1606b is intended to illuminate row b of the display, and so on. In the event that one of the sources, for example 1606a is a dead source, the pixels in row a would not be illuminated, and the sign would not display the letter "O" as desired. In this arrangement, it can be seen that redundancy source 1604 is utilized to replace the dead source 1606a.

In this simple example, it will be apparent that it is not only necessary for the redundant source to be directed so that its output illuminates the correct row, in this case row a, but also necessary that this laser receive all the data information that the source it is replacing would have received. In this instance, the redundant source 1604 should receive information enabling it to illuminate the pixels in row a enabling the display sign to read -OPEN- or CLOSED as appropriate.

Figure 17:
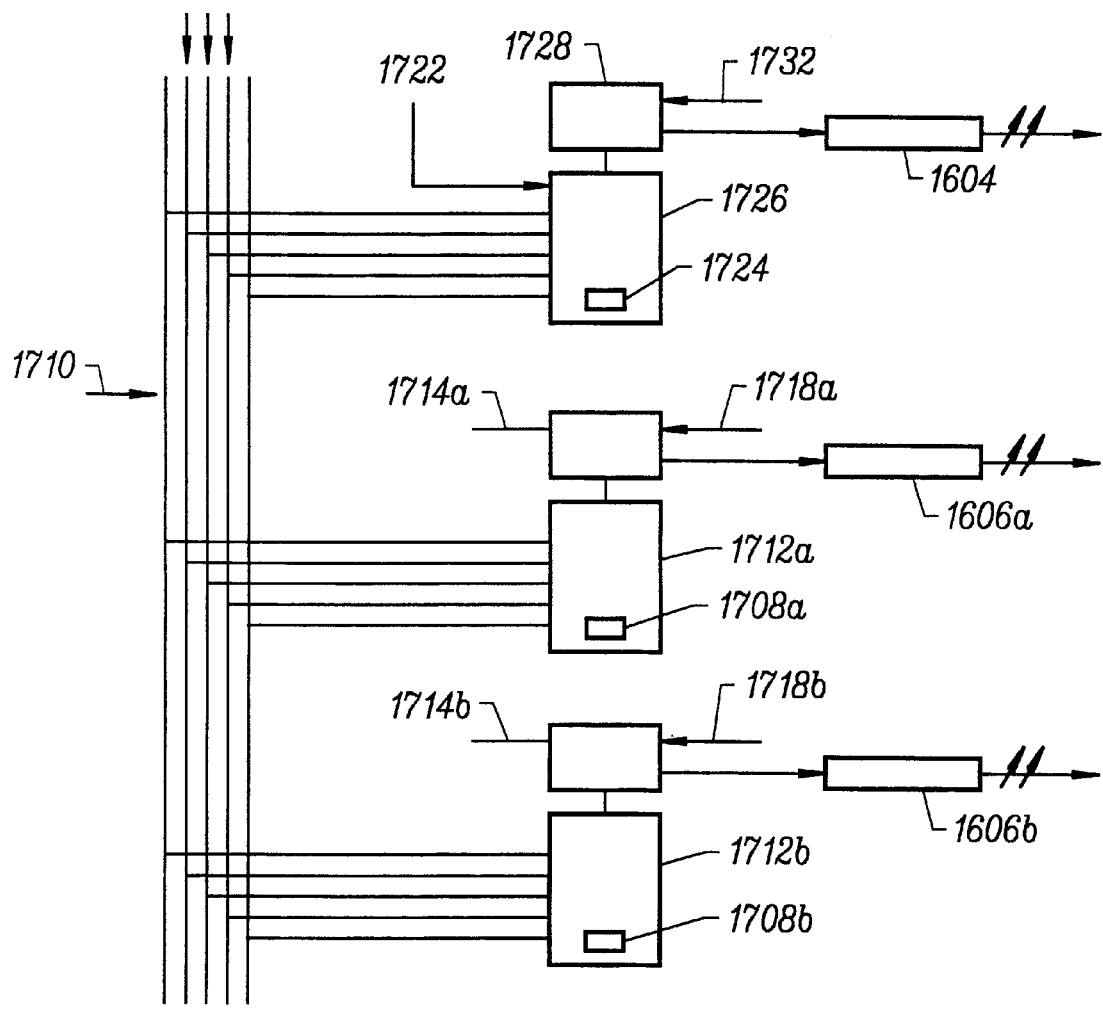
FIG. 17 is a block diagram of a control system used in the system of FIG. 16.

FIG. 17 illustrates by means of a block diagram an example of an arrangement that may be used in a control unit such as 1602 in FIG. 16, to enable the redundancy source 1604 to not only become operative, but also to ensure it has all the information it requires to replace the source it has been selected to replace, source 1606a.

Referring to FIG. 17, the arrangement includes an information bus 1710, which is connected in parallel to a plurality of control units 1712a, 1712b, . . . (collectively, 1712). Bus 1710 is also connected to a redundant control unit 1726. Each of the control units 1712 corresponds to a respective one of the primary lasers 1606a, 1606b, . . . (collectively, 1606) (FIG. 16), and the redundant control unit 1726 corresponds to the redundant laser source 1604 (FIG. 16). Each of the control units 1712 and 1726 has a respective data output which is connected to the input of a register 1714a, 1714b, . . . (collectively, 1714) and 1728, respectively, the data output of which controls the corresponding laser source 1606 or 1604. The data output by the registers 1714 and 1728 are clocked by respective clock signals 1718a, 1718b, . . . (collectively, 1718) and 1732, respectively. Each of the primary laser sources is assigned a respective address or identification number, and these numbers are stored in registers 1708a, 1708b, . . . (collectively, 1708) in the control units 1712. Redundant control unit 1726 also contains a register 1724 for storing the address of the primary laser, if any, which the redundant laser 1604 is to replace. The address stored in register 1724 in the redundant control unit 1726 is programmable, whereas the address stored in registers 1708 in the primary control units 1712 may be either fixed or programmable in different embodiments. In the embodiment of FIG. 17, the address registers 1708 are not programmable. Redundant control unit 1726 receives an additional signal 1722 for programming address register 1724 with the address of the primary laser which is to be replaced, or for disabling the output of control unit 1726 if the none of the primary lasers 1606 are to be replaced.

Optionally, the primary laser control unit registers 1708 may be programmed to disable the drive to any of the defective lasers 1606.

In normal operation, the data sequence for all of the laser sources 1606 is carried on the information bus 1710. If all of the primary laser sources 1606 are functional, each control unit 1712 pulls off from the information bus 1710 the specific data destined for its corresponding laser source 1606, as identified in its address register 1708. The data sequence is provided to the corresponding register 1714, and is eventually clocked out to control the corresponding laser 1606.

If one of the lasers, for example 1606a, is nonfunctional, then the address of laser 1606a is programmed into address register 1724 in the redundant control unit 1726. The redundant control unit 1726 is then enabled. Thereafter, when the device is operated, the redundant control unit 1726 will pull from the information bus 1710 the data sequence that was destined for the laser source 1606*a*. As with the primary control units 1712, redundant control unit 1726 feeds the resulting data sequence to the register 1 728, where it is eventually clocked out to control the redundant laser 1604. Thus, laser 1604 will now selectively turn on or off in the same pattern which the laser 1606*a* would have followed if it had been functional.

The type of control information or data carried on the information bus 1710 may vary dependent upon the type of control circuitry employed to control the optical sources. For example, a redundancy apparatus may provide for optical sources to be controlled in dependence upon certain control information, the control information controlling each source to provide an optical output of a specified intensity to a given destination.

For example, the control data may comprise at least two pieces of information, a 10 bit address and 8 data bits dictating the intensity value of the light to be emitted. These two pieces of control information may be transmitted on the bus simultaneously or at different times. Alternatively, one or more addresses could be associated with a plurality of data values. If the information bus is time domain multiplexed, the address could be inferred based on transmission time slots, for example, so that the only information actually being transmitted would be the 8 data bits.

It will be apparent that this is only an example of one type of control that could be adopted by such a system. Alternatives to this system will be apparent to those skilled in the art.

Note that whereas some guiding structures, waveguides and optical sources are sometimes referred to herein as primary, secondary or redundant, it will be understood that these designations are merely labels which refer to particular subsets of such components. They are not intended to require that components in any one subset be connected or used before the components in any other subset are connected or used. In addition, as used herein, a "subset" of a group of elements refers to any one or more of such elements, including all of such elements.

The invention has now been explained with reference to specific embodiments. Other embodiments will be apparent to those of ordinary skill in the art. Therefore, it is not intended that the invention be limited, except as indicated by the appended claims, which form a part of this invention description.

We claim:

1. Redundant optical connection apparatus for coupling optical energy from a plurality of optical sources to a plurality of application structures, comprising:

a plurality of primary waveguides crossing a redundancy array region from a plurality of upstream inputs in a one-to-one correspondence to a respective plurality of downstream outputs, a first cross-connection waveguide intersecting a first subset greater than one of said primary waveguides within said redundancy array region;

a first optical redirector disposed to transfer optical energy from said first cross-connection waveguide into only a first one of the primary waveguides which said first cross-connection waveguide intersects, in a downstream direction, and an optical source that fails predetermined functionality criteria, disposed upstream of said first optical redirector in a path to guide optical energy into said first primary waveguide.

2. Apparatus according to claim 1, wherein said first optical redirector is distinct from said primary waveguides and from said first cross-connection waveguide.

3. Apparatus according to claim 1, wherein one of said optical sources is aligned with said first cross-connection waveguide.

4. Apparatus according to claim 3, wherein the optical source that is aligned with said first cross-connection waveguide satisfies predetermined functionality criteria.

5. Apparatus according to claim 1, further comprising:

a secondary waveguide extending into said redundancy array region from upstream of said redundancy array region and intersecting said first cross-connection waveguide; and a second optical redirector disposed to couple optical energy from said secondary waveguide into said first cross-connection waveguide toward said first optical redirector.

6. Apparatus according to claim 5, further comprising a second cross-connection waveguide intersecting, at least a second subset of said primary waveguides within said redundancy array region.

7. Apparatus according to claim 5, further comprising an optical source that satisfies said predetermined functionality criteria, aligned with said secondary waveguide upstream of said second optical redirector.

8. Apparatus according to claim 5, wherein each of said primary waveguides extends through a parallel region and into an application region at an entry thereof and having predetermined spacings therebetween at said entry of said application region, wherein said secondary waveguide extends into and terminates within said parallel region, and wherein all of said primary waveguides are straight and parallel to each other within said parallel region and have said predetermined spacings therebetween within said parallel region, said secondary waveguide being interleaved between two of said primary waveguides in said parallel region.

9. Apparatus according to claim 1, wherein each of said primary waveguides is aligned with a respective optical source upstream of said redundancy array region, said first primary waveguide being aligned with said optical source that fails predetermined functionality criteria.

10. Apparatus according to claim 1, wherein each of said primary waveguides extends into said redundancy array region from a preliminary array region upstream of said redundancy array region, further comprising:

a plurality of preliminary cross-connection waveguides intersecting at least respective ones of said primary waveguides within said preliminary array region, and an optical redirector disposed to redirect optical energy from at least a subset of said preliminary cross-connection waveguides into respective ones of said primary waveguides toward said redundancy array region.

11. Apparatus according to claim 10, wherein no optical source which satisfies predetermined functionality criteria is aligned with any preliminary cross-connection waveguide from which an optical redirector is disposed to redirect optical energy to said first primary waveguide.

12. Apparatus according to claim 1, wherein one of said optical redirectors comprises a mirror.

13. Apparatus according to claim 1, wherein said primary waveguides fan out through a fanout region upstream of said redundancy array region, said primary waveguides following a curved path through said fanout region and being straight and parallel to each other within said redundancy array region.

14. Redundant optical connection apparatus for coupling optical energy from a plurality of optical sources to a plurality of application structures, comprising:

a plurality of primary waveguides crossing a redundancy array region from a plurality of upstream inputs in a one-to-one correspondence to a respective plurality of downstream outputs;

a first cross-connection waveguide intersecting at least a first subset of said primary waveguides within said redundancy array region, said first subset including first and second primary waveguides;

a first optical redirector disposed to couple optical energy from said first primary waveguide into said first cross-connection waveguide toward said second primary waveguide; and a second optical redirector disposed to couple optical energy from said first cross-connection waveguide into said second primary waveguide in a downstream direction, at least one of said first and second optical redirectors being permanent.

15. Apparatus according to claim 14, wherein said first and second optical redirectors are distinct from said primary waveguides and from said first cross-connection waveguide.

16. Apparatus according to claim 14, wherein both of said first and second optical redirectors are permanent.

17. Apparatus according to claim 14, further comprising a second cross-connection waveguide intersecting said first primary waveguide and at least one other one of the primary waveguides in said plurality of primary waveguides.

18. Apparatus according to claim 14, further comprising a plurality of optical sources arranged in a bar, each of said primary waveguides being aligned in a path to couple optical energy into a respective one of said optical sources.

19. Apparatus according to claim 18, wherein the optical source aligned in a path with said first primary waveguide satisfies predetermined functionality criteria, and wherein the optical source aligned in a path with said second primary waveguide fails said predetermined functionality criteria.

20. Apparatus according to claim 14, wherein said primary waveguides fan out through a fanout region upstream of said redundancy array region, said primary waveguides following a curved path through said fanout region being straight and parallel to each other within said redundancy array region.

21. Redundant optical connection apparatus for coupling optical energy to a plurality of application structures, comprising:

a redundancy array including a plurality of primary waveguides, a predetermined subset of said primary waveguides having respective optical outputs couplable to respective application structures, said redundancy array further including a plurality of cross-connection waveguides each intersecting a respective subset greater than one of the primary waveguides in said predetermined subset;

a plurality of optical sources each aligned in a path to propagate optical energy into a respective one of the waveguides in said redundancy array, at least a first one of said optical sources failing predetermined functionality criteria and at least a second one of said optical sources satisfying said predetermined functionality criteria; and a set of at least one optical redirector, the optical redirectors in said set being disposed at selected intersections of said primary waveguides and said cross-connection waveguides to couple optical energy from selected ones of the waveguides in said redundancy array into selected others of the waveguides in said redundancy array, such that downstream of said redundancy array, said predetermined subset of said primary waveguides are in paths coupled to carry optical energy in a one-to-one correspondence from respective ones of said optical sources which satisfy said predetermined functionality criteria.

22. Apparatus according to claim 21, wherein said optical redirectors are distinct from said primary waveguides and from said cross-connection waveguides.

23. Apparatus according to claim 21, wherein all of said optical sources are aligned in paths to propagate optical energy into a respective one of said primary waveguides, wherein one of said optical redirectors is disposed to couple optical energy from a first one of said primary waveguides into a first one of said cross-connection waveguides toward a second one of said primary waveguides, said first primary waveguide not being in said predetermined subset of primary waveguides, and wherein one of said optical redirectors is disposed to couple optical energy from said first cross-connection waveguide into said second primary waveguide in a downstream direction, said second primary waveguide being in said predetermined subset of primary waveguides.

24. Apparatus according to claim 23, wherein all of said optical sources are arranged in a bar.

25. Apparatus according to claim 21, wherein said plurality of optical sources includes a first subset of optical sources aligned in a path to propagate optical energy into a respective one of said primary waveguides and a second subset of optical sources aligned in a path to propagate optical energy into a respective one of said cross-connection waveguides, said first subset including said first optical source and being aligned in a path to propagate optical energy into a first one of said primary waveguides, said second subset including said second optical source and being aligned in a path to propagate optical energy into a first one of said cross-connection waveguides, and wherein one of said optical redirectors is disposed to couple optical energy from said first cross-connection waveguide into said first primary waveguide in a downstream direction, said second primary waveguide being in said predetermined subset of primary waveguides.

26. Apparatus according to claim 25, wherein all of said primary waveguides are in said predetermined subset of primary waveguides.

27. Apparatus according to claim 25, wherein all of said optical sources are arranged in a bar.

28. Apparatus according to claim 21, wherein all of said optical sources are aligned in paths to propagate optical energy into respective ones of said cross-connection waveguides, wherein said predetermined subset of said primary waveguides includes all of said primary waveguides, and wherein said set of optical redirectors includes at least one optical redirector coupling optical energy into each of said primary waveguides.

29. Apparatus according to claim 21, wherein said set of optical redirectors includes a permanent optical redirector.

30. Apparatus according to claim 21, wherein said set of optical redirectors includes a dynamic redirector.

31. Apparatus according to claim 21, wherein said primary waveguides fan out through a fanout region upstream of said redundancy array region, said primary waveguides following a curved path through said fanout region and being straight and parallel to each other within said redundancy array region.

32. An integrated optical routing structure comprising:

a plurality of N spaced optical inputs;

a plurality of M spaced optical outputs, M<N; and a redundancy facilitation structure which facilitates permanent coupling of optical energy to all of said optical outputs in a predetermined one-to-one correspondence from M desired ones of said optical inputs.

33. A structure according to claim 32, wherein said redundancy facilitation structure comprises:

M primary guiding structures coupling each of said primary optical outputs to receive optical energy from a respective optical input in a primary subset of M of said optical inputs;

at least one cross-connection waveguide each crossing at least one of said primary guiding structures at a respective crossing, each of said crossings being prepared for permanent coupling of optical energy from one of said cross-connection waveguides into one of said primary guiding structures.

34. A structure according to claim 33, wherein each of said cross-connection waveguides is coupled to receive optical energy from a respective one of said optical inputs outside of said primary subset of optical inputs.

35. A structure according to claim 33, wherein said redundancy facilitation structure further comprises:

N-M secondary guiding structures each coupled to receive optical energy from a respective one of said optical inputs outside of said primary subset of optical inputs, each of said secondary guiding structures crossing at least one of said cross-connection waveguides at a respective redundancy crossing, each of said redundancy crossings being prepared for permanent coupling of optical energy from one of said secondary guiding structures into one of said cross-connection waveguides.

36. A structure according to claim 32, wherein said redundancy facilitation structure comprises:

M primary guiding structures crossing a redundancy array region to respective ones of said M optical outputs;

N cross-connection waveguide each crossing at least one of said primary guiding structures at a respective crossing, each of said crossings being prepared for permanent coupling of optical energy from one of said cross-connection waveguides into one of said primary guiding structures.

37. A structure according to claim 32 wherein said redundancy facilitation structure comprises a gap region between said optical inputs and said optical outputs within which optical guiding structures may be formed to said optical outputs from desired ones of said optical inputs.

38. A structure according to claim 32, for use with a source of control information, further comprising:

a plurality of at least M optical sources each coupled to provide optical energy into a respective one of said optical inputs; and control circuitry which controls each of said optical sources in dependence upon said control information, said control information including informational units having destination addresses associated therewith, and said control circuitry controlling individual ones of said optical sources in dependence upon a correspondence between said destination addresses and said optical sources, said correspondence being at least partially programmable.

39. A structure according to claim 38, wherein said control circuitry comprises a plurality of control units each controlling a respective one of said optical sources, all of said control units being coupled to said source of control information and receiving all of said informational units.

40. A structure according to claim 38, wherein in said control circuitry, the correspondence between said destination addresses and one of said optical sources is programmable and the correspondence between said destination addresses and another of said optical sources is fixed.

41. A structure according to claim 38, wherein each of said optical outputs is associated with a respective one of said destination addresses.

42. Redundant optical connection apparatus for coupling optical energy to a plurality of application structures, comprising:

a plurality of output guiding structures each arranged to guide optical energy to a respective one of said application structures; and a set of at least one cross-connection waveguide, each of said cross-connection waveguides having an input and crossing at least one of said output guiding structures at respective crossings, said cross-connection waveguides all terminating without coupling to any application structure, each of said crossings being prepared for permanent coupling of optical energy from one of said cross-connection waveguides into one of said output guiding structures.

43. Optical connection apparatus for coupling optical energy to a plurality of optical outputs from selected ones of a plurality of optical inputs, for use with a plurality of optical sources including first and second optical sources, comprising a plurality of optical paths including a first optical path arranged to carry optical energy from a first one of said optical inputs to a first one of said optical outputs and a second optical path arranged to carry optical energy from a second one of said optical inputs, said first optical source arranged to provide optical energy to said first optical input and said second optical source arranged to provide optical energy to said second optical input, said apparatus further including a optical redirector disposed in both said first and second optical paths and arranged to couple optical energy out of said second optical path and into said first optical path toward said first optical output, wherein said first optical source fails predetermined functionality criteria.

44. Optical connection apparatus for coupling optical energy to a plurality of optical outputs from selected ones of a plurality of optical inputs, comprising a plurality of optical paths including a first optical path arranged to carry optical energy from a first one of said optical inputs to a first one of said optical outputs and a second optical path arranged to carry optical energy from a second one of said optical inputs, said apparatus further including a redundancy facilitation structure which facilitates introduction of a permanent optical redirector disposed in both said first and second optical paths and arranged to couple optical energy out of said second optical path and into said first optical path toward said first optical output.

45. Optical connection apparatus for coupling optical energy to a plurality of optical outputs from selected ones of a plurality of optical inputs, comprising a plurality of optical paths including a first optical path arranged to carry optical energy from a first one of said optical inputs to a first one of said optical outputs and a second optical path arranged to carry optical energy from a second one of said optical inputs, said apparatus further including a redundancy facilitation structure which facilitates introduction of an optical redirector disposed in both said first and second optical paths and arranged to couple optical energy out of said second optical path and into said first optical path toward said first optical output, said optical redirector further blocking at least a portion of any optical energy in said first optical path from reaching said first optical output.

46. Optical connection apparatus for coupling optical energy to a plurality of optical outputs from selected ones of a plurality of optical inputs, for use with a plurality of optical sources including first and second optical sources, comprising a plurality of optical paths including a first optical path arranged to carry optical energy from a first one of said optical inputs to a first one of said optical outputs and a second optical path arranged to carry optical energy from a second one of said optical inputs, said first optical source arranged to provide optical energy to said first optical input and said second optical source arranged to provide optical energy to said second optical input, said apparatus further including a redundancy facilitation structure which facilitates introduction of an optical redirector disposed in both said first and second optical paths and arranged to couple optical energy out of said second optical path and into said first optical path toward said first optical output, wherein said first optical source fails predetermined functionality criteria.

47. Redundant optical connection apparatus for coupling optical energy to a plurality of optical outputs, comprising:
 a plurality of output guiding structures each arranged to guide optical energy to a respective one of said optical outputs; and
 a set of at least one cross-connection waveguide, each of said cross-connection waveguides crossing at least one of said output guiding structures at respective crossings, said crossings coupling substantially no optical energy from cross-connection waveguides into output guiding structures, but each of said crossings being prepared for permanent coupling of optical energy from one of said cross-connection waveguides into one of said output guiding structures.

48. Redundant integrated optical connection apparatus for coupling optical energy to a plurality of application structures, for use with a plurality of primary optical sources and a first secondary optical source, comprising:
 a plurality of primary guiding structures coupling each of said primary optical sources to a respective one of said application structures;
 a first secondary guiding structure coupled to said first secondary optical source and terminating without coupling to any application structure; and
 a redundancy facilitation structure which facilitates permanent coupling of optical energy from said first secondary guiding structure into to any desired one of said primary guiding structures in a downstream direction.

49. Apparatus according to claim 48, wherein said application structures comprise respective pixels of a display.

50. Apparatus according to claim 48, wherein said application structures comprise respective connections of an optical connector.

51. Apparatus according to claim 48, further comprising a cross-coupling guiding structure extending from a proximity of said first secondary guiding structure to a proximity of a first one of said primary guiding structures.

52. Apparatus according to claim 48, further comprising a cross-coupling guiding structure extending from a proximity of said first secondary guiding structure and crossing at least one of said primary guiding structures.

53. Apparatus according to claim 52, wherein each of said primary guiding structures comprises a primary waveguide aligned with a respective one of said primary optical sources, said primary waveguides fanning out through a fanout region to a first parallel region within which all of said primary waveguides are straight and parallel to each other, said primary waveguides following a curved path through said fanout region,
 and wherein said cross-coupling guiding structure comprises a cross-coupling waveguide which crosses at least one of said primary waveguides, all of the primary waveguides which said cross-coupling waveguide crosses being crossed within said parallel region.

54. Apparatus according to claim 48, wherein said first secondary guiding structure extends from a proximity of said first secondary optical source to a proximity of a first one of said primary guiding structures.

55. Apparatus according to claim 48, wherein said first secondary guiding structure extends from a proximity of said first secondary optical source and crosses at least one of said primary guiding structures.

56. Apparatus according to claim 48, wherein said redundancy facilitation structure comprises a permanent structure (708, 806) which, when and only when assisted by additional structure, guides optical energy from said first secondary guiding structure into a first one of said primary guiding structures.

57. Apparatus according to claim 56, further comprising a cross-coupling guiding structure extending from a proximity of said first secondary guiding structure to a proximity of said first primary guiding structure,
 wherein said permanent structure, when assisted by said additional structure, guides optical energy from said cross-coupling guiding structure into said first primary guiding structure.

58. Apparatus according to claim 56, wherein said permanent structure comprises a waveguide (708) which couples with said first primary guiding structure at such an angle that substantially no optical energy propagating in said first primary guiding structure is lost by reason of said permanent structure absent further structure (712).

59. Apparatus according to claim 58, wherein said permanent structure comprises a waveguide segment (806) which is spaced sufficiently from said first primary guiding structure such that substantially no optical energy propagating in said first primary guiding structure is lost by reason of said permanent structure absent further structure (808).

60. Apparatus according to claim 48, wherein each of said primary guiding structures comprises a primary waveguide aligned with a respective one of said primary optical sources, said primary waveguides extending through a parallel region and into an application region at an entry thereof and having predetermined spacings therebetween at said entry of said application region,
 wherein said secondary guiding structure comprises a secondary waveguide aligned with said first secondary optical source, said first secondary optical source being disposed between two of said primary optical sources, said secondary waveguide extending into and terminating within said parallel region,
 and wherein all of said primary waveguides are straight and parallel to each other within said parallel region and have said predetermined spacings therebetween within said parallel region, said secondary waveguide being interleaved between two of said primary waveguides in said parallel region.

61. A method of manufacturing a multiple optical source having a plurality of optical outputs for providing optical energy to application structures, for use with a number of optical sources, at least N of which satisfy predetermined functionality criteria, said number of optical sources exceeding N, comprising the steps of:

providing in an integrated optical unit a plurality of output waveguides, one for each of said optical outputs;

providing information that at least N specified ones of said optical sources satisfy said functionality criteria; and introducing structure into said integrated optical unit, in dependence upon said information, which guides optical energy into each of said output waveguides toward said optical outputs from a respective one of said sources which satisfy said functionality criteria.

62. A product produced according to the process of claim 61.

63. A method according to claim 61, wherein said structure is distinct from said output waveguides.

64. A method according to claim 61, wherein said step of providing information that at least N specified ones of said optical sources satisfy said functionality criteria, comprises the step of providing an indication of which of said optical sources fail said functionality criteria.

65. A method according to claim 61, wherein at least one of said optical sources fails said functionality criteria.

66. A method according to claim 61, wherein said step of introducing structure comprises the step of forming permanent structure.

67. A method according to claim 61, wherein said step of introducing structure comprises the step of permanently activating pre-existing structure.

68. A method according to claim 61, wherein said step of introducing structure comprises the step of activating electrically controllable structure.

69. A method according to claim 61, wherein said number of optical sources includes a first optical source which fails said functionality criteria and further includes a second optical source, wherein said plurality of output waveguides includes a first output waveguide arranged in a path to receive optical energy from said first optical source, and wherein said step of introducing structure comprises the step of introducing structure which guides optical energy from said second optical source into said first output waveguide in a downstream direction.

70. A method according to claim 69, further comprising the step of providing a secondary waveguide arranged in a path to guide optical energy from said second source and terminating without reaching any application structures, wherein said step of introducing structure which guides optical energy from said second optical source comprises the step of introducing an optical redirector which is disposed to redirect optical energy from said secondary waveguide into said first output waveguide in a downstream direction.

71. A method according to claim 70, wherein said step of introducing an optical redirector comprises the step of introducing an optical redirector which is disposed to redirect optical energy from a first cross-connection waveguide into said first output waveguide, and wherein said step of introducing structure which guides optical energy from said second optical source further comprises the step of introducing an optical redirector which is disposed to redirect optical energy from said secondary waveguide into said first cross-connection waveguide toward said first output waveguide.

72. A method according to claim 71, wherein all of said optical redirectors are distinct from said output waveguides, from said secondary waveguide, and from said first cross-connection waveguide.

73. A method according to claim 70, wherein said secondary waveguide intersects said first output waveguide, and wherein said step of introducing structure which guides optical energy from said second optical source further comprises the step of introducing an optical redirector which is disposed to redirect optical energy from said secondary waveguide into said first output waveguide.

74. A method according to claim 73, wherein said optical redirector is distinct from said first output waveguide and from said secondary output waveguide.

75. A method according to claim 61, further comprising the step of providing a plurality of cross-connection waveguides, each arranged in a path to guide optical energy from a respective one of said optical sources, each of said cross-connection waveguides intersecting at least a respective subset of said output waveguides, wherein said step of introducing structure comprises the step of, in dependence upon said information, introducing optical redirectors at selected intersections of said output waveguides and said cross-connection waveguides, each of said optical redirectors being disposed to couple optical energy from one of said cross-connection waveguides into one of said output waveguides.

76. A method according to claim 75, wherein a first one of said optical sources fails said functionality criteria, wherein said plurality of cross-connection waveguides includes a first cross-connection waveguide arranged in a path to guide optical energy from said first optical source, and wherein said step of introducing optical redirectors at selected intersections in dependence upon said information, comprises the step of selecting said selected intersections such that all of said optical outputs are in paths to receive optical energy from ones of said sources which satisfy said predetermined functionality criteria.

77. A product produced according to the process of claim 69.

78. A product produced according to the process of claim 71.

79. A product produced according to the process of claim 73.

80. A product produced according to the process of claim 75.

81. A method according to claim 61, wherein said step of introducing structure comprises the step of introducing, in dependence upon said information, optical guiding structures which guide optical energy into each of said output waveguides from respective ones of said optical sources which satisfy said functionality criteria.

82. A method according to claim 81, wherein each of said output waveguides has a respective input spaced from said optical sources, wherein said step of introducing optical guiding structures comprises the step of forming waveguides to the inputs of each of said output waveguides from respective ones of said optical sources, selected in dependence upon said information.

83. A product produced according to the process of claim 77.

84. A method of manufacturing a multiple optical source having a plurality of optical outputs for providing optical energy to application structures, comprising the steps of:

providing a plurality of optical sources, including a plurality of primary sources and a first secondary source, at least a first one of said primary sources failing predetermined functionality criteria;

providing in an integrated optical unit a plurality of primary guiding structures each arranged in a path to guide optical energy from a respective one of said primary sources downstream in a one-to-one correspondence to a respective one of said optical outputs, said plurality of primary guiding structures including a first primary guiding structure arranged in a path to guide optical energy from said first primary source and further including a second primary guiding structure;

providing in said integrated optical unit a first secondary guiding structure arranged in a path to guide optical energy from said first secondary source, said first secondary guiding structure intersecting both said first and second primary guiding structures upstream of their respective optical outputs; and introducing structure that is disposed in said integrated optical unit to transfer optical energy from said first secondary source into said first primary guiding structure in a downstream direction and not into said second primary guiding structure.

85. A product produced according to the process of claim 84.

86. Apparatus according to claim 84, wherein said step of introducing structure comprises the step of introducing structure distinct from said primary guiding structures and from said first secondary guiding structure.

87. A method according to claim 84, wherein said step of introducing structure occurs subsequently to said steps of providing a plurality of optical sources and providing a plurality of primary guiding structures.

88. A method according to claim 84, wherein said step of introducing structure comprises the step of forming permanent structure.

89. A method according to claim 84, wherein said step of introducing structure comprises the step of permanently activating pre-existing structure.

90. A method according to claim 84, wherein said step of introducing structure comprises the step of activating electrically controllable structure.

91. A method according to claim 84, wherein said first secondary guiding structure terminates without reaching any application structures, and wherein said step of introducing structure comprises the step of introducing an optical redirector which is disposed to redirect optical energy from said first secondary guiding structure into said first primary guiding structure in a downstream direction.

92. A method according to claim 91, wherein said first secondary guiding structure comprises an input waveguide arranged in a path to guide optical energy from said first secondary source, a first cross-connection waveguide which intersects both said first and second primary guiding structures, and an optical redirector disposed to transfer optical energy out of said input waveguide and into said first cross-connection waveguide, and wherein said step of introducing an optical redirector comprises the step of introducing an optical redirector which is disposed to redirect optical energy from said first cross-connection waveguide into said first primary guiding structure.

93. A method according to claim 91, wherein said first secondary guiding structure comprises an input waveguide which is aligned with said first secondary source and which intersects said first primary guiding structure, and wherein said step of introducing structure comprises the step of introducing an optical redirector which is disposed to redirect optical energy from said input waveguide into said first primary guiding structure.

94. A product produced according to the process of claim 92.

95. A product produced according to the process of claim 93.

* * * * *